(12) United States Patent
Takase

(10) Patent No.: US 11,156,763 B2
(45) Date of Patent: Oct. 26, 2021

(54) LIGHTING DEVICE WITH LOW LUMINANCE LIGHT OUTGOING REGION, HIGH LUMINANCE LIGHT OUTGOING REGION, AND DISPLAY DEVICE COMPRISING THE SAME

(71) Applicant: SHARP KABUSHIKI KAISHA, Sakai (JP)

(72) Inventor: Kenji Takase, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/632,747

(22) PCT Filed: Jul. 20, 2018

(86) PCT No.: PCT/JP2018/027238
§ 371 (c)(1),
(2) Date: Jan. 21, 2020

(87) PCT Pub. No.: WO2019/021952
PCT Pub. Date: Jan. 31, 2019

(65) Prior Publication Data
US 2021/0132285 A1  May 6, 2021

(30) Foreign Application Priority Data

Jul. 28, 2017 (JP) .............................. JP2017-146397

(51) Int. Cl.
*F21V 8/00* (2006.01)
(52) U.S. Cl.
CPC ......... *G02B 6/0076* (2013.01); *G02B 6/0018* (2013.01); *G02B 6/0023* (2013.01);
(Continued)

(58) Field of Classification Search
CPC ................ G02B 6/0031; G02B 6/0076; G02F 1/133615
See application file for complete search history.

(56) References Cited

U.S. PATENT DOCUMENTS

| 2009/0295744 A1* | 12/2009 | Onishi | ................. G06F 3/0412 345/173 |
| 2018/0074249 A1 | 3/2018 | Hirasawa | |
| 2018/0074255 A1* | 3/2018 | Den Breejen | ............ G02B 6/00 |

FOREIGN PATENT DOCUMENTS

WO     2016/163176 A1    10/2016

* cited by examiner

*Primary Examiner* — Keith G. Delahoussaye
(74) *Attorney, Agent, or Firm* — ScienBiziP, P.C .

(57) ABSTRACT

A lighting device includes a first light source a first light guide plate having a first light entrance surface and a first light outgoing surface and including a first high luminance light outgoing region through which a large amount of light rays exit and a first low luminance light outgoing region through which a small amount of light rays exit, a first reflection member, a second light source, a second light guide plate overlapping the first light guide plate and having a second light entrance surface and a second light outgoing surface and including a second high luminance light outgoing region overlapping the first low luminance light outgoing region and through which a large amount of light rays exit and a second low luminance light outgoing region overlapping the first high luminance light outgoing region and through which a small amount of light rays exit, and a second reflection member.

12 Claims, 21 Drawing Sheets

(52) U.S. Cl.
CPC ......... *G02B 6/0025* (2013.01); *G02B 6/0031* (2013.01); *G02B 6/0036* (2013.01); *G02B 6/0051* (2013.01); *G02B 6/0053* (2013.01); *G02B 6/0055* (2013.01); *G02B 6/0058* (2013.01); *G02B 6/0068* (2013.01); *G02B 6/0061* (2013.01)

LIGHTING DEVICE WITH LOW LUMINANCE LIGHT OUTGOING REGION, HIGH LUMINANCE LIGHT OUTGOING REGION, AND DISPLAY DEVICE COMPRISING THE SAME

TECHNICAL FIELD

The present invention relates to a lighting device and a display device.

BACKGROUND ART

As an example of a lighting device used for a conventional liquid crystal display device, a lighting device described in Patent Document 1, described below, has been known. The lighting device described in Patent Document 1 includes a light guide section including a plurality of light guide plates each including a light incidence section and a light emission surface while being stacked in a thickness direction, a plurality of light sources that emit light toward the light incidence section in each of the light guide plates in the light guide section, and a substrate that supports the plurality of light sources while including a circuit section for driving each of the light sources arranged therein. A first section where the circuit section is arranged in the substrate is arranged to oppose a back surface of the light guide section.

RELATED ART DOCUMENT

Patent Document

Patent Document 1: Japanese Unexamined Patent Application Publication No. 2016/163176

Problem to be Solved by the Invention

In the lighting device described in the above-described Patent Document 1, each of respective light emission surfaces of the plurality of light guide plates stacked in the thickness direction is divided into a plurality of light emission areas, and light emission of each of the light emission areas individually follows lighting of a plurality of light sources, to realize so-called local dimming. However, the light emission areas in each of the respective light emission surfaces of the plurality of light guide plates are arranged not to overlap one another. Thus, lighting obtained by enlarging a luminance difference referred to as an HDR (High Dynamic Range) is difficult to realize.

DISCLOSURE OF THE PRESENT INVENTION

The present invention has been completed based on the above-described circumstances, and an object of the present invention is to achieve an HDR.

Means for Solving the Problem

A lighting device according to an aspect of the present invention includes a first light source of a top view type having a first light emission surface through which light is emitted, a first light guide plate having a first light entrance end surface that is a part of an outer peripheral edge surface thereof and through which light from the first light source enters and a first light outgoing plate surface that is one of plate surfaces thereof and through which light exits, and the first light guide plate including a first high luminance light outgoing region that is a part of the first light outgoing plate surface and through which a relatively large amount of light rays exit and a first low luminance light outgoing region that is a part of the first light outgoing plate surface and through which a relatively small amount of light rays exit, a first reflection member having a first reflection surface that opposes both the first light emission surface and the first light entrance end surface and reflects light emitted through the first light emission surface toward the first light entrance end surface, a second light source of a top view type having a second light emission surface that emits light, a second light guide plate overlapping the first light guide plate and having a second light entrance end surface that is a part of an outer peripheral edge surface thereof and through which Light from the second light source enters and a second light outgoing plate surface that is one of plate surfaces thereof and through which light exits, and the second light guide plate including a second high luminance light outgoing region that is a part of the second light outgoing plate surface and overlaps the first low luminance light outgoing region and through which a relatively large amount of light rays exit and a second low luminance light outgoing region that is a part of the second light outgoing plate surface and overlaps the first high luminance light outgoing region, and through which a relatively small amount of light rays exit, and a second reflection member having a second reflection surface that opposes both the second light emission surface and the second light entrance end surface and reflects light emitted through the second light emission surface toward the second light entrance end surface.

Light emitted from the first light emission surface of the first light source is reflected on the first reflection surface of the first reflection member, to be incident on the first light entrance end surface of the first light guide plate. On the other hand, light emitted from the second light emission surface of the second light source is reflected on the second reflection surface of the second reflection member, to be incident on the second light entrance end surface of the second light guide plate. Light from the first light source incident on the first light guide plate is emitted from the first light outgoing plate surface after propagating through the first light guide plate. On the other hand, light from the second light source incident on the second light guide plate is emitted from the second light outgoing plate surface after propagating through the second light guide plate. Although an amount of emitted light from the first high luminance light outgoing region in the first light outgoing plate surface of the first light guide plate is relatively large, an amount of emitted light from the first low luminance light outgoing region is relatively small. On the other hand, although an amount of emitted light from the second high luminance light outgoing region, which overlaps the first low luminance light outgoing region, in the second light outgoing plate surface of the second light guide plate is relatively large, an amount of emitted light from the second low luminance light outgoing region, which overlaps the first high luminance light outgoing region, is relatively small.

Accordingly, emitted light from the lighting device includes respective emitted lights from the first low luminance light outgoing region and the second high luminance light outgoing region that overlap each other and respective emitted lights from the first high luminance light outgoing region and the second low luminance light outgoing region that overlap each other. Therefore, when a light emission amount of the first light source and a light emission amount of the second light source are adjusted, a luminance distribution related to the emitted light from the lighting device can be easily changed. As a result, such control that the emitted light from the lighting device is locally increased becomes easy. Accordingly, this is favorable in realizing lighting obtained by enlarging a luminance difference referred to as an HDR (High Dynamic Range).

Both the first light source and the second light source are of a top view type, and there are larger in light emission amount than light sources of a side view type, which is more favorable in realizing a higher luminance and an HDR of the lighting device. Moreover, when the first reflection surface of the first reflection member is made to oppose both the first light emission surface of the first light source and the first light entrance end surface of the first light guide plate while the second reflection surface of the second reflection member is made to oppose both the second light emission surface of the second light source and the second light entrance end surface of the second light guide plate, lights emitted from the first light emission surface and the second light emission surface can be respectively reflected by the first reflection surface and the second reflection surface, to be incident on the first light entrance end surface and the second light entrance end surface, which is favorable in thinning the first light guide plate and the second light guide plate as well as the lighting device.

Advantageous Effect of the Invention

According to the present invention, an HDR can be realized.

MODES FOR CARRYING OUT THE INVENTION

First Embodiment

Figure 1:
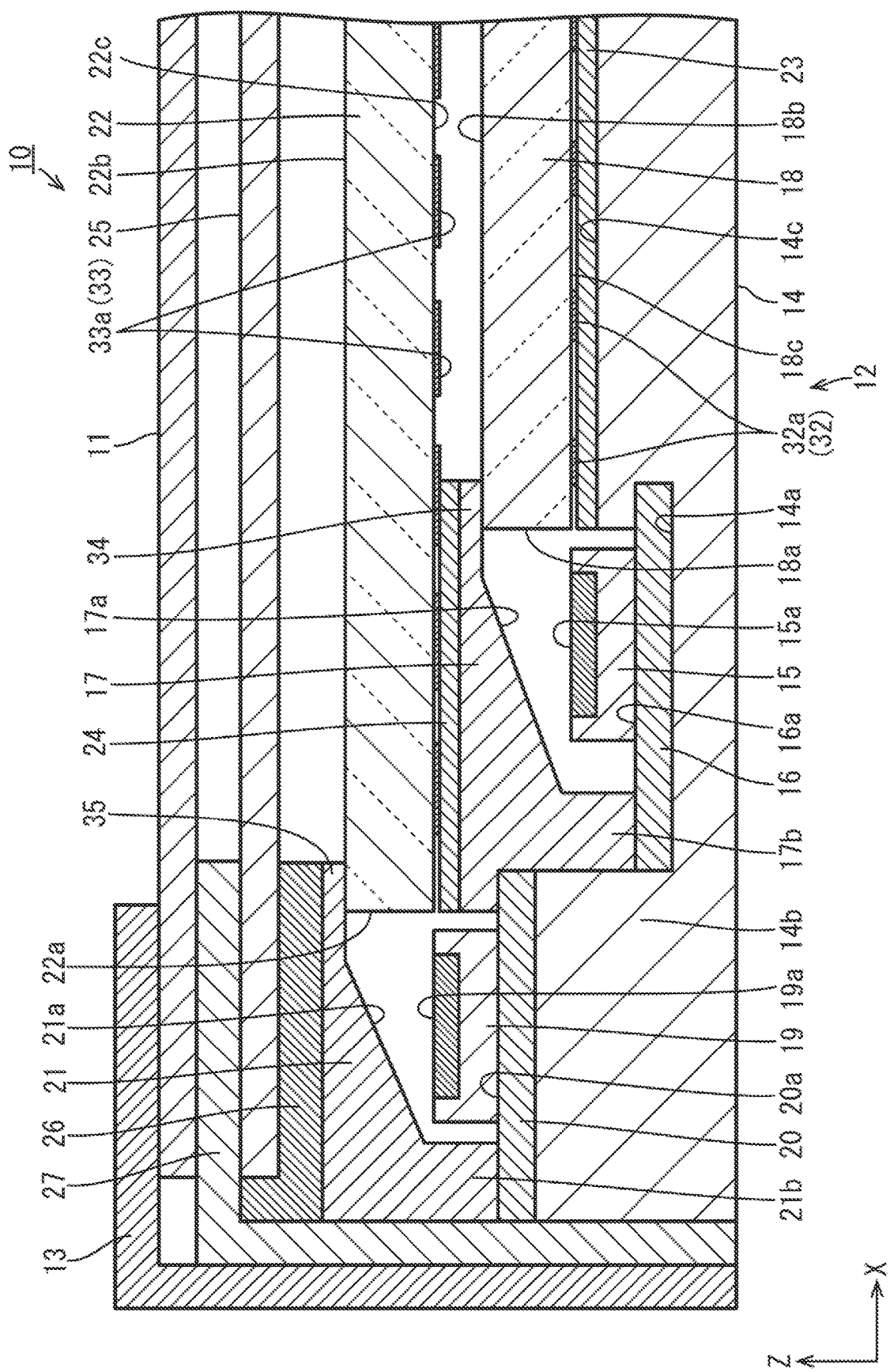
FIG. 1 is a side sectional view of a liquid crystal display device according to a first embodiment of the present invention.

A first embodiment of the present invention will be described with reference to FIG. 1 to FIG. 6. In the present embodiment, a liquid crystal display device (display device) 10 will be illustrated as an example. An X-axis, a Y-axis, and a Z-axis are illustrated in a part of each of the drawings, and a direction along each of the axes is drawn to be a direction illustrated in the drawing. An upper side and a lower side in FIG. 1 are respectively a front side and a rear side.

The liquid crystal display device 10 according to the present embodiment includes a liquid crystal panel 11 that displays an image, and a backlight device (lighting device) 12 as an external light source that supplies light for display to the liquid crystal panel 11. The liquid crystal panel 11 and the backlight device 12 are integrally held by a frame-shaped bezel 13 or the like.

The liquid crystal panel 11 includes at least a pair of glass substrates affixed to each other with a predetermined gap defined therebetween and a liquid crystal layer including liquid crystal molecules as a substrate that is sealed between both the glass substrates and changes in optical characteristic as an electric field is applied, as illustrated in FIG. 1. One of the glass substrates (an array substrate or an active matrix substrate) is provided with an orientation film or the like in addition to a switching element (e.g., a TFT) connected to a source line and a gate line that are perpendicular to each other and a pixel electrode disposed in a squareshaped region surrounded by the source line and the gate line and connected to the switching element being planarly arranged in a matrix shape. The other glass substrate (an opposite substrate or a CF substrate) is provided with light shielding layers (black matrices) respectively disposed among colored portions in R (red), C (green), B (blue), and the like to have a lattice shape, a solid-shaped counter electrode having a shape opposing the pixel electrode, an orientation film, and the like in addition to a color filter in which the colored portions are planarly arranged in a matrix shape in a predetermined sequence. Polarizing plates are respectively disposed outside both the glass substrates.

Figure 2:
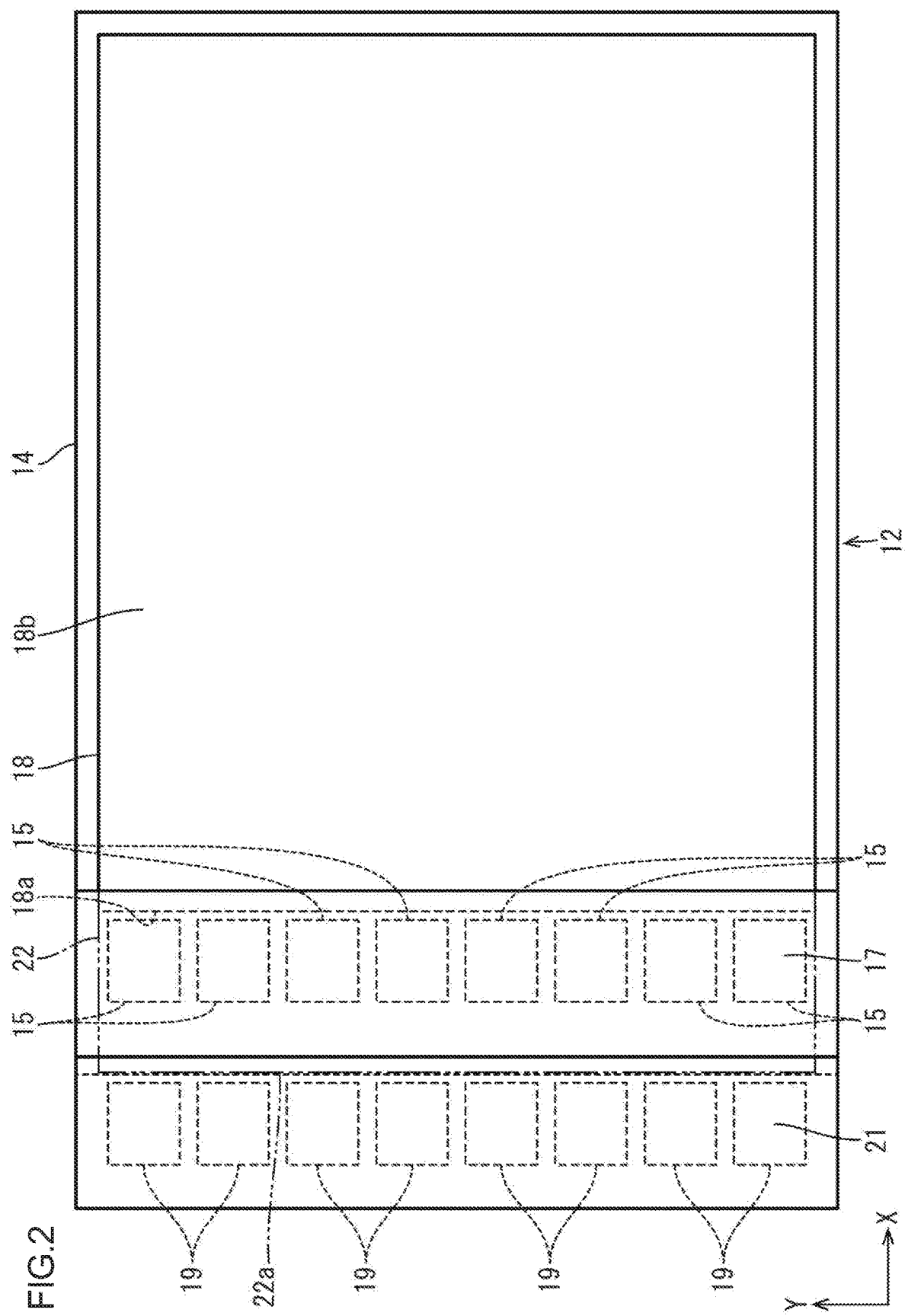
FIG. 2 is a plan view of a backlight device constituting the liquid crystal display device.

The backlight device 12 has a horizontally long square shape as a whole, and includes at least a chassis (housing) 14, a plurality of first LEDs (first light sources) 15, a first LED substrate (first light source substrate) 16 on which the plurality of first LEDs 15 are mounted, a first reflection member 17 that reflects light from the first LED 15, a first light guide plate 18 that guides light from the first LED 15 reflected by the first reflection member 17, a plurality of second LEDs (second light sources) 19, a second LED substrate (second light source substrate) 20 on which the plurality of second LEDs 19 are mounted, a second reflection member 21 that reflects light from the second LED 19, and a second light guide plate 22 that guides light from the second LED 19 reflected by the second reflection member 21. In FIG. 2, the second light guide plate 22 is illustrated by a two-dot and dash line. Out of them, the first light guide plate 18 and the second light guide plate 22 are arranged to overlap each other in a planar view, and the first light guide plate 18 and the second light guide plate 22 are respectively disposed on the relatively rear side and the relatively front side. The backlight device 12 includes a first reflection sheet 23 interposed between the chassis 14 and the first light guide plate 18, a second reflection sheet 24 interposed between the first reflection member 17 and the second light guide plate 22, an optical sheet 25 interposed between the second light guide plate 22 and the liquid crystal panel 11, an optical sheet receiving member 26 that receives an outer peripheral end of the optical sheet 25 from the rear side, and an optical sheet pressing member 27 that presses the outer peripheral end of the optical sheet 25 from the front side. The backlight device 12 is of an edge light type (side light type) in a one-side light entrance type in which lights from the LEDs 15 and 19 respectively enter the light guide plates 18 and 22 only from one side. Then, each of components in the backlight device 12 will be described in detail. Although a case where the second reflection member 21 and the optical sheet receiving member 26 are respectively separate components is illustrated as an example in the present embodiment, they may be of an integral type.

The chassis 14 has a horizontally long square shape as a whole, and its large part has a flat plate shape for supporting the first light guide plate 18 and the first reflection sheet 23 from the rear side, as illustrated in FIG. 1 and FIG. 2. A first LED substrate attachment recess 14a to which the first LED substrate 16 is attached and a second LED substrate attachment protrusion. 14b to which the second LED substrate 20 is attached are respectively provided at ends, on the side on which the LEDs 15 and 19 are disposed, of the chassis 14. The first LED substrate attachment recess 14a is provided in a form recessed toward the rear side from a supporting surface 14c that supports the first light guide plate 18 and the first reflection sheet 23 from the rear side in the chassis 14, and is disposed inside of the second LED substrate attachment protrusion 14b in the X-axis direction. The second LED substrate attachment protrusion 14b is provided in a form protruding toward the front side from the first LED substrate attachment recess 14a and the above-described supporting surface 14c, and supports the second LED substrate 20 at a position relatively higher in the Z-axis direction than the first LED substrate 16 (a position relatively close to the liquid crystal panel 11). The second LED substrate attachment protrusion 14b is disposed outside of the first LED substrate attachment recess 14a in the X-axis direction. The chassis 14 has its long side direction matching the X-axis direction, and has its short side direction matching the Y-axis direction.

The first LED 15 is surface-mounted on the first LED substrate 16 while being of a so-called top view type (a top surface light emission type or an upper surface light emission type) in which a first light emission surface 15a that emits light is directed toward the opposite side to the side of the first LED substrate 16, as illustrated in FIG. 1. The second LED 19 is surface-mounted on the second LED substrate 20 while being of a top view type in which a second light emission surface 19a that emits light is directed toward the opposite side to the side of the second LED substrate 20. The first light emission surface 15a and the second light emission surface 19a, respectively, in the first LED 15 and the second LED 19 are each brought into a horizontal plane in parallel with the X-axis direction and the Y-axis direction, and are also each in parallel with a plate surface of the liquid crystal panel 11 and respective plate surfaces of the light guide plates 18 and 22. Light emitted from each of the respective light emission surfaces 15a and 19a of the LEDs 15 and 19 contains light that travels in a normal direction of the light emission surface, i.e., the Z-axis direction in the largest amount, and an optical axis having the highest light emission intensity matches the Z-axis direction. Accordingly, each of the LEDs 15 and 19 is of a top view type, and therefore is larger in light emission amount than an LED of a side view type (a side surface light emission type) in which a light emission surface is adjacent to a mounting surface on an LED substrate, for example, which is more favorable in achieving a higher luminance, for example. Each of the LEDs 15 and 19 is configured such that an LED chip performs monochromatic light emission of blue light, for example, and emits white light as a whole when phosphors (a yellow phosphor, a green phosphor, a red phosphor, etc.) are dispersed and mixed with a sealing material.

The first LED substrate 16 has an elongated plate shape extending in the short side direction (Y-axis direction) of the chassis 14, and a first mounting surface 16a on which the first LED 15 is mounted is in parallel with the plate surface of the liquid crystal panel 11 and the respective plate surfaces of the light guide plates 18 and 22. The plurality of first LEDs 15 are mounted in a form lined up in the Y-axis direction with a predetermined spacing on the first mounting surface 16a of the first LED substrate 16 while a wiring pattern. (not illustrated) for supplying power to each of the first LEDs 15 is patterned. The first LED substrate 16 is attached in a form housed within the first LED substrate attachment recess 14a in the chassis 14, and its plate surface on the opposite side to the first mounting surface 16a is an attachment surface to the first LED substrate attachment recess 14a. The second LED substrate 20 has an elongated plate shape extending in a form in parallel with the first LED substrate 16, and a second mounting surface 20a on which the second LED 19 is mounted is in parallel with the first mounting surface 16a, the plate surface of the liquid crystal panel 11, and the respective plate surfaces of the light guide plates 18 and 22. The plurality of second LEDs 19 are mounted in a form lined up in the Y-axis direction with a predetermined spacing on the second mounting surface 20a of the second LED substrate 20 while a wiring pattern (not illustrated) for supplying power to each of the second LEDs 19 is patterned. The second LED substrate 20 has its plate surface, on the opposite side to the second mounting surface 20a, attached in a form contacting the second LED substrate attachment protrusion 14b in the chassis 14. The first LED substrate 16 and the second LED substrate 20 are respectively disposed at positions spaced apart from each other in the X-axis direction (a normal direction of each of light entrance end surfaces 18a and 22a, described below), and the second LED substrate 20 and the first LED substrate 16 are respectively disposed on the relatively outer side in the X-direction and on the relatively inner side (the side closer to each of the light guide plates 18 and 22) in the X-axis direction. The second LED substrate 20 is supported by the second LED substrate attachment protrusion 14b in the chassis 14, and is therefore arranged on a different level in the Z-axis direction from the first LED substrate 16 housed within the first LED substrate attachment recess 14a.

The first reflection member 17 and the second reflection member 21 have their respective surfaces each exhibiting a white color or a silver color, for example, and excellent in light reflectivity. The first reflection member 17 has a strip shape extending in the short side direction (Y-axis direction) of the chassis 14, and is disposed in a form overlapping the plurality of first LEDs 15 and the first LED substrate 16 in a planar view, as illustrated in FIG. 1 and FIG. 2. The first reflection member 17 has its inner surface directed toward the first LEDs 15 and the first LED substrate 16 set as a first reflection surface 17a that reflects light emitted from the first LED 15. The first reflection surface 17a is set as an inclined surface crossing the first light emission surface 15a of the first LED 15, and is inclined to oppose both the first light emission surface 15a and the first light entrance end surface 18a of the first light guide plate 18, described below. More specifically, the first reflection surface 17a is inclined to both the X-axis direction and the Z-axis direction, and can travel, by reflecting light that is emitted from the first LED 15 to travel substantially in a Z-axis direction, the reflected light substantially in an X-axis direction. The first reflection member 17 includes a first reflection member holding section 17b that is raised in the Z-axis direction along the second LED substrate attachment protrusion 14b while abutting on each of the first LED substrate 16 and the second LED substrate 20 to hold the first reflection member 17. The first reflection member holding section 17b separates a space where the first LEDs 15 are arranged and a space where the second LEDs 19 are arranged, respectively, to enter independent states. Accordingly, traveling of light between both the spaces is avoided. The second reflection member 21 has a strip shape extending in a form in parallel with the first reflection member 17, and is disposed in a form overlapping the plurality of second LEDs 19 and the second LED substrate 20 in a planar view. The second reflection member 21 has its inner surface directed toward the second LEDs 19 and the second LED substrate 20 set as a second reflection surface 21a that reflects light emitted from the second LED 19. The second reflection surface 21a is set as an inclined surface crossing the second light emission surface 19a of the second LED 19, and is inclined to oppose both the second light emission surface 19a and the second light entrance end surface 22a of the second light guide plate 22, described below. More specifically, the second reflection surface 21a is inclined to both the X-axis direction and the Z-axis direction, and can travel, by reflecting light that is emitted from the second LED 19 to travel substantially in a Z-axis direction, the reflected light substantially in an X-axis direction. The second reflection member 21 includes a second reflection member holding section 21b that abuts on the second LED substrate 20 to hold the second reflection member 21. Therefore, the second reflection member 21 is arranged on a different level in the Z-axis direction from the first reflection member 17, and a difference between their respective heights is made equal to a difference in height between both the LED substrates 16 and 20. Therefore, a distance from the first LED 15 to the first reflection surface 17a of the first reflection member 17 and a distance from the second LED 19 to the second reflection surface 21a of the second reflection member 21 are made substantially equal to each other.

The first light guide plate 18 and the second light guide plate 22 are each composed of a synthetic resin material (e.g., an acrylic resin material such as PMMA) being substantially transparent and having a sufficiently higher refractive index than that of air. The first light guide plate 18 and the second light guide plate 22 each have a horizontally long square shape in a planar view, and are each housed within the chassis 14 in a form disposed at a position immediately below the liquid crystal panel 11 and the optical sheet 25 in a posture in which the plate surface is in parallel with respective plate surfaces of the liquid crystal panel 11 and the optical sheet 25, as illustrated in FIG. 1 and FIG. 2. The first light guide plate 18 is supported by the supporting surface 14c of the chassis 14 substantially over its entire area, and is arranged to overlap the second light guide plate 22 at a position spaced apart therefrom on the rear side in the Z-axis direction. The first light guide plate 18 has its end surface, on the short side positioned on the left side illustrated in FIG. 1, of its outer peripheral end surface set as the first light entrance end surface 18a on which light emitted from the first LED 15 and reflected by the first reflection surface 17a of the first reflection member 17 is incident. In a pair of front and rear plate surfaces of the first light guide plate 18, the plate surface directed toward the front side (toward the side of the liquid crystal panel 11) is set as a first light outgoing plate surface 18b that emits light toward the liquid crystal panel 11 and the optical sheet 25, and the plate surface directed toward the rear side is set as a first light outgoing opposite plate surface 18c on the opposite side to the first light outgoing plate surface 18b. The first light guide plate 18 is arranged such that the first light outgoing opposite plate surface 18c is substantially flush with the first light emission surface 15a of the first LED 15. The first light outgoing plate surface 18b has its entire area substantially covered with the second light guide plate 22, described below, from the front side. The second light guide plate 22 is arranged to overlap the first light guide plate 18 at a position spaced apart therefrom on the front side in the Z-axis direction. The second light guide plate 22 has its end surface, on the short side positioned on the left side illustrated in FIG. 1, of its outer peripheral end surface as the second light entrance end surface 22a on which light emitted from the second LED 19 and reflected by the second reflection surface 21a of the second reflection member 21 is incident. In a pair of front and rear plate surfaces of the second light guide plate 22, the plate surface directed toward the front side is set as a second light outgoing plate surface 22b that emits light toward the liquid crystal panel 11 and the optical sheet 25, and the plate surface directed toward the rear side is set as a second light outgoing opposite plate surface 22c on the opposite side to the second light outgoing plate surface 22b. The second light guide plate 22 has its portion having the second light entrance end surface 22a disposed in a form protruding outward in the X-axis direction from the first light entrance end surface 18a of the first light guide plate 18 while overlapping the first reflection member 17 on the front side. The second light guide plate 22 is arranged such that the second light outgoing opposite plate surface 22c is substantially flush with the second light emission surface 19a of the second LED 19. By such a configuration, the light guide plates 18 and 22 respectively have functions of introducing lights reflected on the reflection surfaces 17a and 21a of the reflection members 17 and 21 to travel in the X-axis direction from the light entrance end surfaces 18a and 22a while raising the lights in the Z-axis direction after propagating the lights therethrough to emit the lights toward the optical sheet 25 (forward or toward the light emission side) from the light outgoing plate surfaces 18b and 22b.

The first reflection sheet 23 and the second reflection sheet 24 have their respective surfaces each exhibiting a white color or a silver color, for example, and excellent in light reflectivity, like the reflection members 17 and 21. The first reflection sheet 23 is disposed in a form sandwiched between the chassis 14 and the first light guide plate 18 in the Z-axis direction while being disposed in a form covering the first light outgoing opposite plate surface 18c of the first light guide plate 18 substantially over its entire area, as illustrated in FIG. 1. Therefore, the first reflection sheet 23 can efficiently raise light that has leaked out of the first light outgoing opposite plate surface 18c of the first light guide plate 18 toward the front side (the first light outgoing plate surface 18b). The second reflection sheet 24 is disposed in a form sandwiched between the second light guide plate 22 and the first reflection member 17 in the Z-axis direction while being disposed to partially cover the second light outgoing opposite plate surface 22c of the second light guide plate 22. More specifically, the second reflection sheet 24 is within a formation range to selectively cover a portion, overlapping the first reflection member 17, of the second light outgoing opposite plate surface 22c. Therefore, the second reflection sheet 24 can efficiently raise light that has leaked nut of the second light outgoing opposite plate surface 22c in the vicinity of an end, having the second light entrance end surface 22a, of the second light guide plate 22 toward the front side (the second light outgoing plate surface 22b).

The optical sheet 25 is disposed in a form interposed between the liquid crystal panel 11 and the second light guide plate 22 in the Z-axis direction, to transmit emitted light from each of the light guide plates 18 and 22 and emit the transmitted light toward the liquid crystal panel 11 while providing a predetermined optical function to the transmitted light, as illustrated in FIG. 1. The optical sheet 25 includes a plurality of optical sheets, and examples of the specific type of the optical sheet 25 include a diffusion sheet, a lens sheet (prism sheet), and a reflective polarizing sheet. Any one of the sheets can be appropriately selected and used.

The optical sheet receiving member 26 has a frame shape extending along the outer peripheral end of the optical sheet 25. The optical sheet receiving member 26 has its part disposed in a form overlapping the second reflection member 21 on the front side, and can support the outer peripheral end of the optical sheet 25 substantially over its entire periphery from the rear side, as illustrated in FIG. 1. The optical sheet pressing member 27 includes a portion having a frame shape extending along the outer peripheral end of the optical sheet 25, and the portion can press the outer peripheral end of the optical sheet 25 substantially over the entire periphery from the front side and sandwich the outer peripheral end between the optical sheet receiving member 26 and itself. The optical sheet pressing member 27 includes a portion extending toward the rear side from an outer peripheral end of the portion that presses the optical sheet 25 and covering the second reflection member 21 and the chassis 14 from the outer peripheral side.

Figure 3:
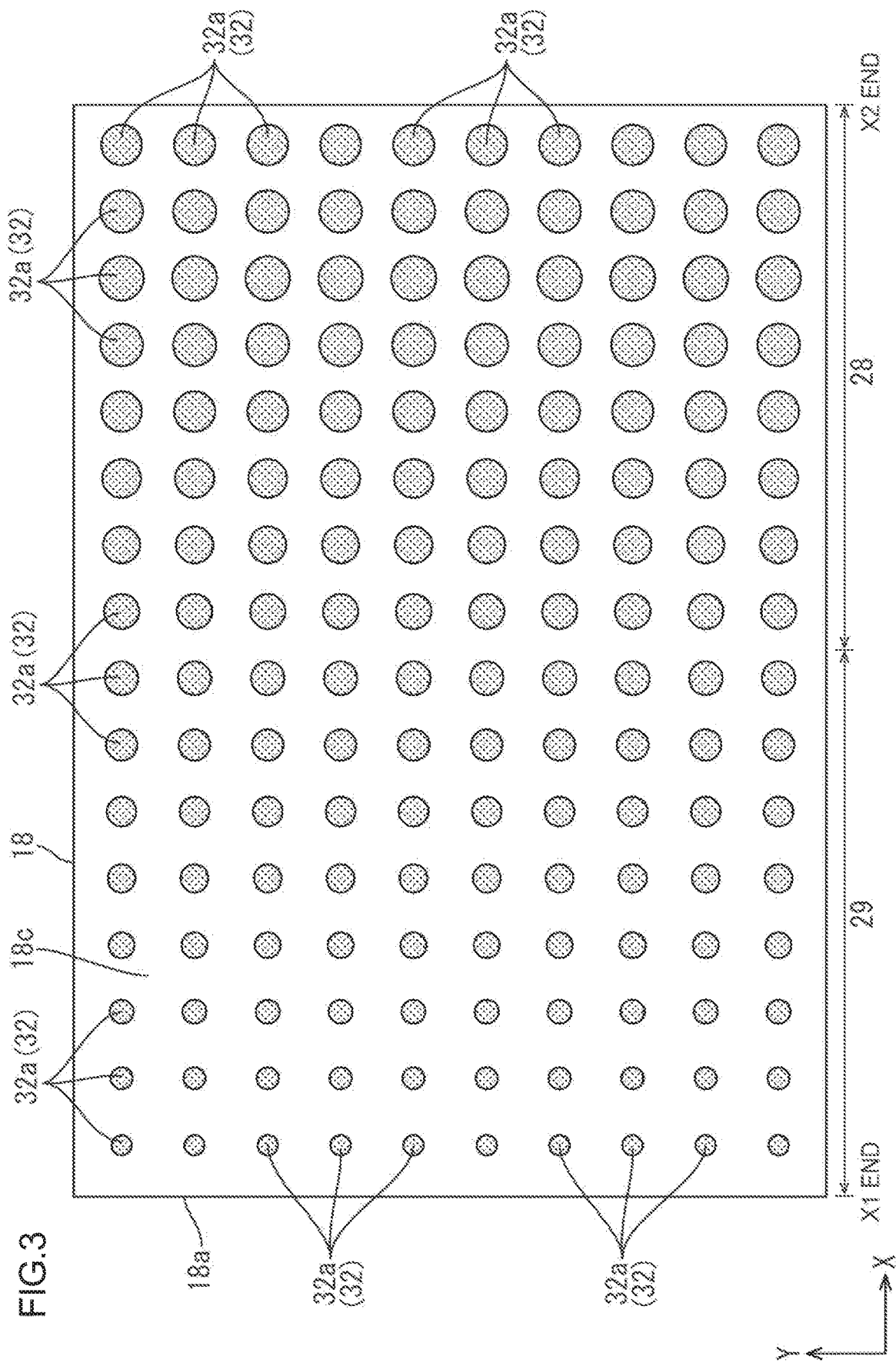
FIG. 3 is a bottom view of a first light guide plate constituting the backlight device.
Figure 4:
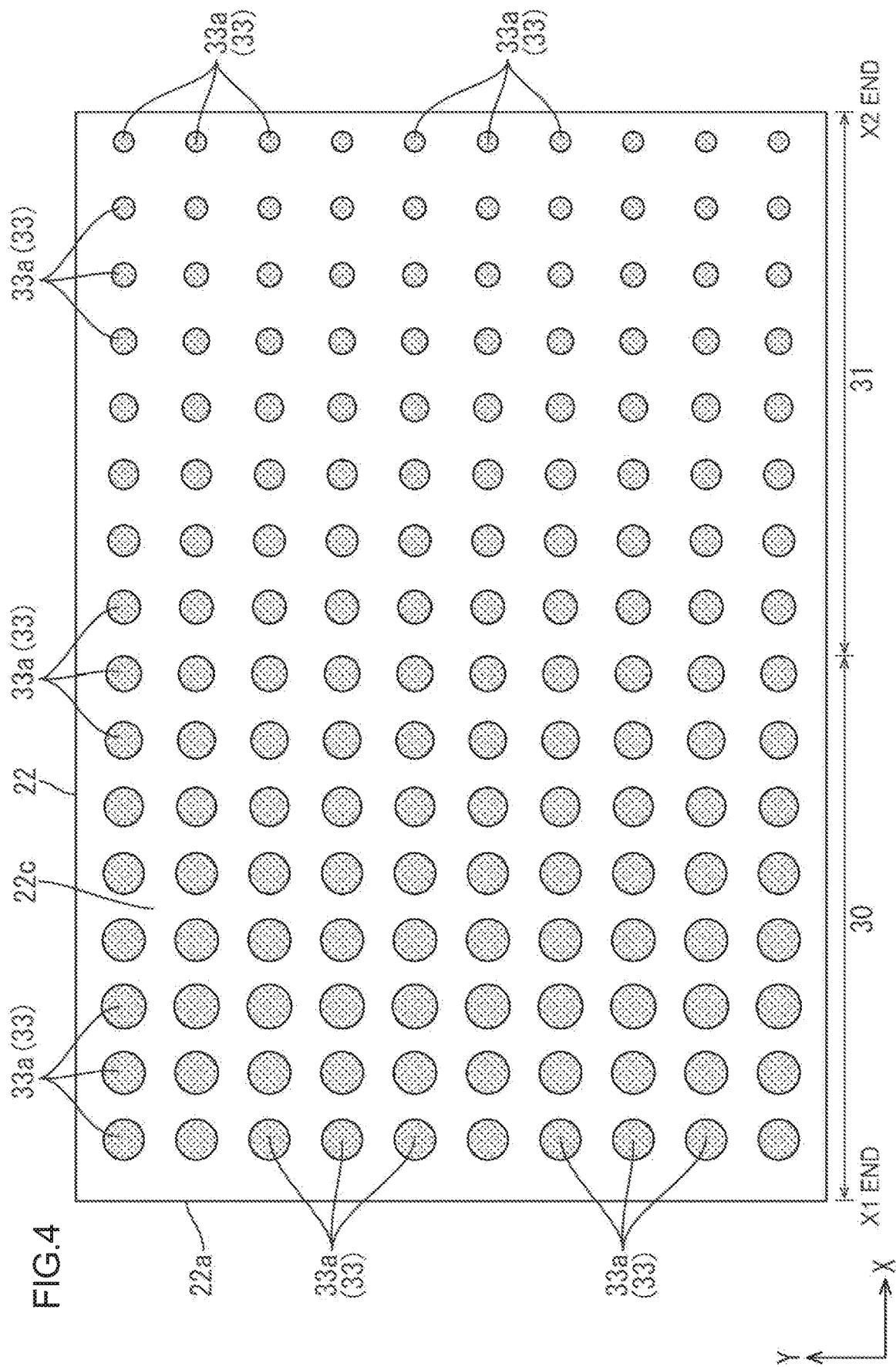
FIG. 4 is a bottom view of a second light guide plate constituting the backlight device.

In the backlight device 12 having the above-described configuration, the first light guide plate 18 includes a first high luminance light outgoing region 28 that is composed of a part of the first light outgoing plate surface 18b and emits a relatively large amount of light and a first low luminance light outgoing region 29 that is composed of a part of the first light outgoing plate surface 18b and emits a relatively small amount of light, as illustrated in FIG. 3. The first high luminance light outgoing region 28 is a region that is approximately half of a region on the opposite side to the side of the first light entrance end surface 18a (on the side far from the first LED 15) in the X-axis direction in the first light outgoing plate surface 18b while the first low luminance light outgoing region 29 is a region that is approximately half of a region on the side of the first light entrance end surface 18a (on the side close to the first LED 15) in the X-axis direction in the first light outgoing plate surface 18b. On the other hand, the second light guide plate 22 disposed in a form substantially overlapping the entire area of the first light guide plate 18 includes a second high luminance light outgoing region 30 that is composed of a part of the second light outgoing plate surface 22b, overlaps the first low luminance light outgoing region 29, and emits a relatively large amount of light and a second low luminance light outgoing region 31 that is composed of a part of the second light outgoing plate surface 22b, overlaps the first high luminance light outgoing region 28, and emits a relatively small amount of light, as illustrated in FIG. 4. The second high luminance light outgoing region 30 is a region that is approximately half of a region on the side of the second light entrance end surface 22a (on the side close to the second LED 19) in the X-axis direction in the second light outgoing plate surface 22b while the second low luminance light outgoing region 31 is a region that is approximately half of a region on the opposite side to the side of the second light entrance end surface 22a (on the side far from the second LED 19) in the X-axis direction in the second light outgoing plate surface 22b.

More specifically, the first light outgoing opposite plate surface 18c of the first light guide plate 18 is provided with a first light outgoing reflection section 32 including many first unit reflection sections 32a that reflect light to urge light outgoing from the first light outgoing plate surface 18b, as illustrated in FIG. 3. Similarly, the second light outgoing opposite plate surface 22c of the second light guide plate 22 is provided with a second light outgoing reflection section 33 including many second unit reflection sections 33a that reflect light to urge light outgoing from, the second light outgoing plate surface 22b, as illustrated in FIG. 4. The first, unit reflection sections 32a and the second unit reflection sections 33a respectively constituting the first light outgoing reflection section 32 and the second light outgoing reflection section 33 are each composed of ink exhibiting a white color containing a metal oxide such as a titanium oxide, and are respectively formed as dot patterns of predetermined distributions illustrated in FIG. 3 and FIG. 4 by printing the ink on the light outgoing opposite plate surfaces 18c and 22c of the light guide plates 18 and 22 (e.g., printing using a dispenser, printing using inkjet, or printing using a screen plate). FIG. 3 and FIG. 4 schematically illustrate the dot patterns respectively related to the light outgoing reflection sections 32 and 33. The first unit reflection sections 32a and the second unit reflection sections 33a respectively scatter and reflect lights that have reached the light outgoing opposite plate surfaces 18c and 22c among lights propagating through the light guide plates 18 and 22, to generate lights respective incidence angles on the light outgoing plate surfaces 18b and 22b of which have values not exceeding a critical angle, and therefore can urge light outgoing from the light outgoing plate surfaces 18b and 22b. The higher respective distribution densities of the unit reflection sections 32a and the unit reflection sections 33a in the light outgoing opposite plate surfaces 18c and 22c (respective area ratios of the light outgoing reflection sections 32 and 33 per unit area in the light outgoing opposite plate surfaces 18c and 22c) becomes, the larger respective amounts of emitted lights (luminances) per unit area in the light outgoing plate surfaces 18b and 22b tend to be. Conversely, the lower the distribution densities become, the smaller the amounts of emitted lights (luminances) tend to be.

Figure 5:
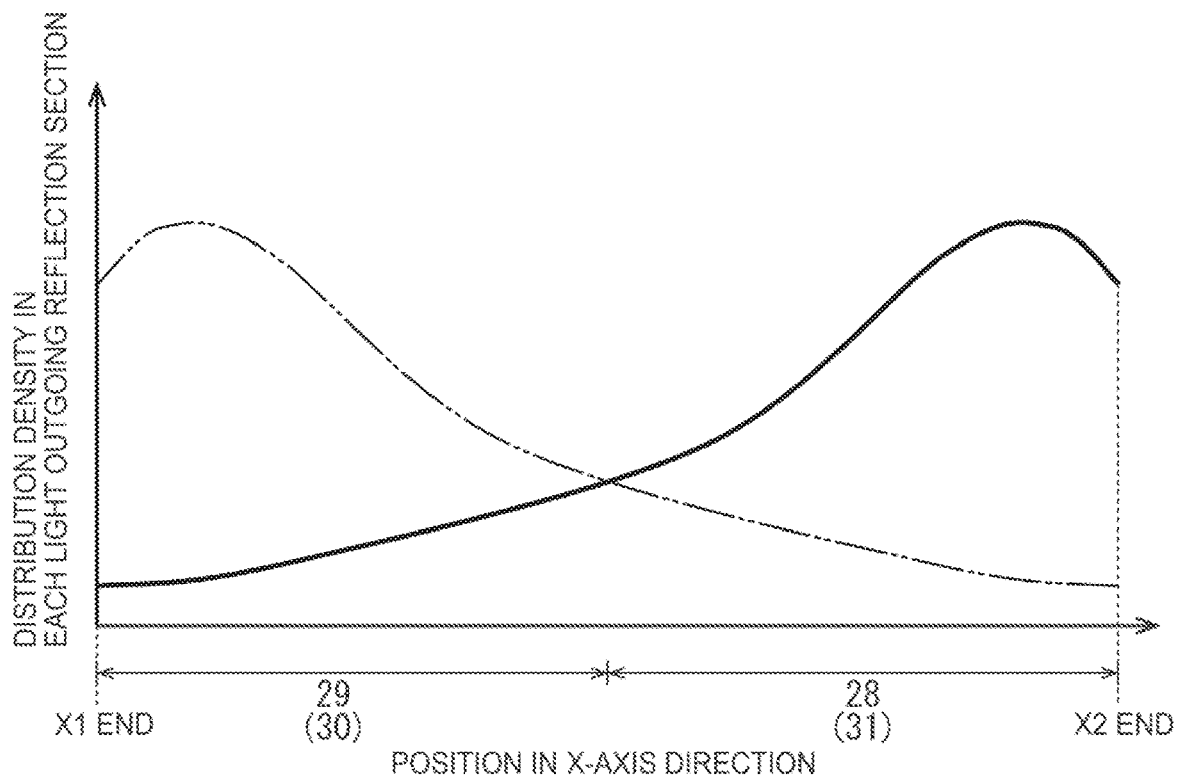
FIG. 5 is a graph illustrating a change in a distribution density of unit reflection sections constituting each of respective light outgoing reflection sections from an X1 end to an X2 end in light outgoing opposite plate surfaces of the light guide plates.

In the first light outgoing reflection section 32, the the distribution density of the first unit reflection sections 32a is made higher in the first high luminance light outgoing region 28 than in the first low luminance light outgoing region 29, as illustrated in FIG. 3 and FIG. 5. FIG. 5 is a graph obtained by plotting the respective distribution densities of the unit reflection sections 32a and the unit reflection sections 33a constituting the light outgoing reflection sections 32 and 33 from an X1 end to an X2 end in the X-axis direction in the light outgoing opposite plate surfaces 18c and 22c of the light guide plates 18 and 22. In FIG. 5, horizontal axis and a vertical axis respectively indicate a position in the X-axis direction and a distribution density of unit reflection sections. In FIG. 5, a graph related to the first light outgoing reflection section 32 and a graph related to the second light outgoing reflection section 33 are respectively indicated by a solid line and a two-dot and dash line, and the second light luminance light outgoing region 30 and the second low luminance light outgoing region 31 are each indicated in parentheses. More specifically, in the first light outgoing reflection section 32, the distribution density of the first unit reflection sections 32a continuously gradually increases toward a maximum value in the first high luminance light outgoing region 28 from a minimum value in the first low luminance light outgoing region 29, and reaches a minimum value in the vicinity of the first light entrance end surface 18a (the X1 end) and reaches a maximum value at a position ahead of the end surface (the X2 end) on the opposite side to the first light entrance end surface 18a. To set the distribution density of the first unit reflection sections 32a as described above, the diameter and the area of each of the first unit reflection sections 32a are changed depending on a position in the X-axis direction in the present embodiment. Accordingly, when light emitted from the first light emission surface 15a of the first LED 15 is reflected on the first reflection surface 17a of the first reflection member 17, to be incident on the first light entrance end surface 18a of the first light guide plate 18, the light is scattered and reflected by the first unit reflection sections 32a constituting the first light outgoing reflection section 32 in a process of propagating through the first light guide plate 18 so that light outgoing from the first light outgoing plate surface 18b is urged. At this time, in the first high luminance light outgoing region 28 in the first light outgoing plate surface 18b, an amount of light scattered and reflected by the first unit reflection sections 32a having a high distribution density is increased so that an amount of emitted light from the first high luminance light outgoing region 28 is large. On the other hand, in the first low luminance light outgoing region 29 in the first light outgoing plate surface 18b, an amount of light scattered and reflected by the first unit reflection sections 32a having a low distribution density is decreased so that an amount of emitted light from the first low luminance light outgoing region 29 is small. Although the respective amounts of emitted lights from the first high luminance light outgoing region 28 and the first low luminance light outgoing region 29 vary depending on a light emission amount of the first LED 15, a large-small relationship therebetween is always maintained.

On the other hand, in the second light outgoing reflection section 33, the distribution density of the second unit reflection sections 33a is made higher in the second high luminance light outgoing region 30 than that in the second low luminance light outgoing region 31, as illustrated in FIG. 4 and FIG. 5. More specifically, in the second light outgoing reflection section 33, the distribution density of the second unit reflection sections 33a continuously gradually increases toward a maximum value in the second high luminance light outgoing region 30 from a minimum value in the second low luminance light outgoing region 31, and reaches a minimum value in the vicinity of an end surface (the X2 end) on the opposite side to the second light entrance end surface 22a and reaches a maximum value at a position ahead of the first light entrance end surface 18a (the X1 end). To set the distribution density of the second unit reflection sections 33a as described above, the diameter and the area of each of the second unit reflection sections 33a are changed depending on a position in the X-axis direction in the present embodiment. Accordingly, when light emitted from the second light emission surface 19a of the second LED 19 is reflected on the second reflection surface 21a of the second reflection member 21, to be incident on the second light entrance end surface 22a of the second light guide plate 22, the light is scattered and reflected by the second unit reflection sections 33a constituting the second light outgoing reflection section 33 in a process of propagating through the second light guide plate 22 so that light outgoing from the second light outgoing plate surface 22b is urged. At this time, in the second high luminance light outgoing region 30 in the second light outgoing plate surface 22b, an amount of light scattered and reflected by the second unit reflection sections 33a having a high distribution density is increased so that an amount of emitted light from the second high luminance light outgoing region 30 is large. On the other hand, in the second low luminance light outgoing region 31 in the second light outgoing plate surface 22b, an amount of light scattered and reflected by the second unit reflection sections 33a having a low distribution density is decreased so that an amount of emitted light from the second low luminance light outgoing region 31 is small. Although the respective amounts of emitted lights from the second high luminance light outgoing region 30 and the second low luminance light outgoing region 31 vary depending on a light emission amount of the second LED 19, a large-small relationship therebetween is always maintained.

Figure 6:
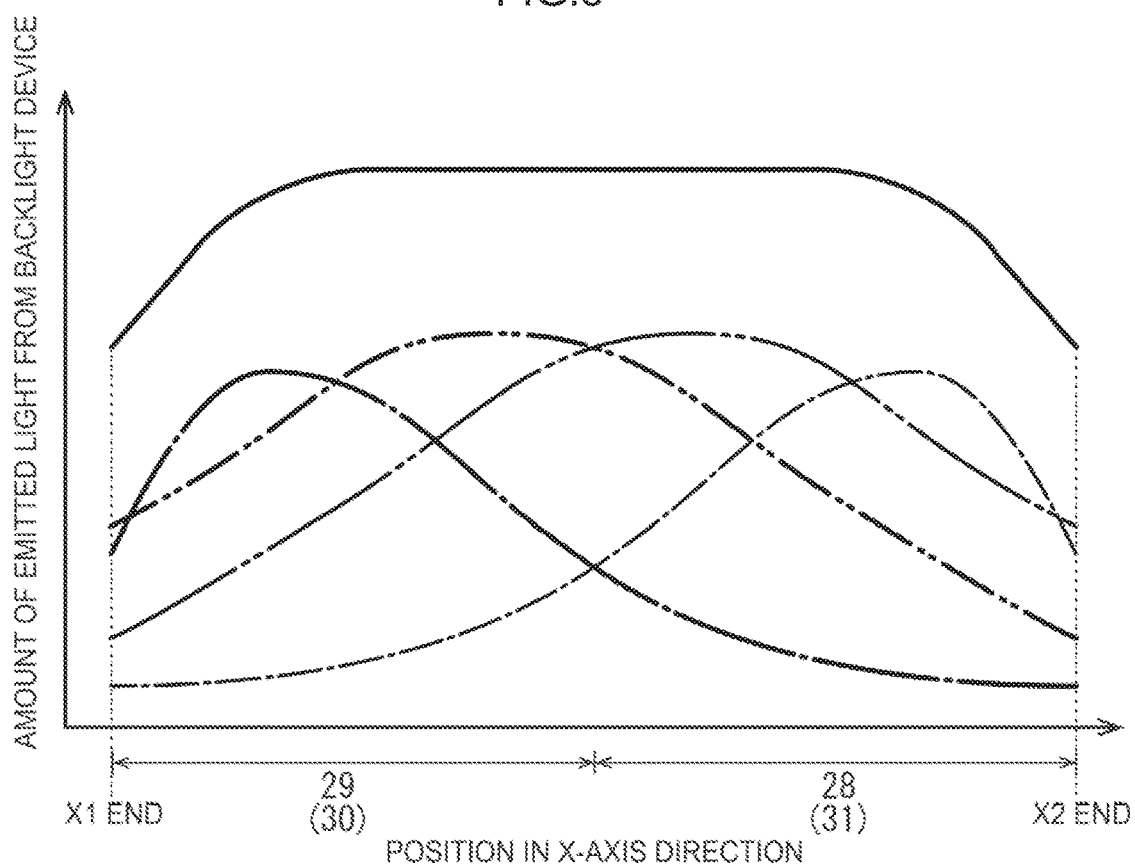
FIG. 6 is a graph illustrating a luminance distribution related to emitted light from, the X1 end to the X2 end in each of respective light outgoing plate surfaces of the light guide plates.

In the backlight device 12, the first light guide plate 18 and the second light guide plate 22 are disposed in a form overlapping each other, as illustrated in FIG. 1. Thus, emitted light from the backlight device 12 includes respective emitted lights from the first low luminance light outgoing region 29 and the second high luminance light outgoing region 30 that overlap each other and respective emitted lights from the first high luminance light outgoing region 28 and the second low luminance light outgoing region 31 that overlap each other. Therefore, when a light emission amount of the first LED 15 that supplies lights to be respectively emitted from the first high luminance light outgoing region 28 and the first low luminance light outgoing region 29 in the first light outgoing plate surface 18b of the first light guide plate 18 and a light emission amount of the second LED 19 that supplies lights to be respectively emitted from the second high luminance light outgoing region 30 and the second low luminance light outgoing region 31 in the second light outgoing plate surface 22b of the second light guide plates 22 are adjusted, a luminance distribution in the X-axis direction related to the emitted light from the backlight device 12 can be easily changed. Hereinafter, the luminance distribution related to the emitted light from the backlight device 12 will be specifically described with reference to FIG. 6. FIG. 6 is a graph obtained by plotting an amount of emitted light (a luminance) from an X1 end to an X2 end in the backlight device 12. In FIG. 6, a graph indicated by a solid line, a graph indicated by a thin one-dot and dash line, a graph indicated by a thick one-dot and dash line, a graph indicated by a thin two-dot and dash line, and a graph indicated by a thick two-dot and dash line respectively represent a case where respective light emission amounts of the first LED 15 and the second LED 19 are each 50%, a case where the second LED 19 is not turned on and only the first LED 15 is turned on (a case where the light emission amount of the first LED 15 is 100% and the light emission amount of the second LED 19 is 0%), a case where the first LED 15 is not turned on and only the second LED 19 is turned on (a case where the light, emission amount of the second LED 19 is 100% and the light emission amount of the first LED 15 is 0%), a case where the light emission amount of the first LED 15 is 70% and the light emission amount of the second LED 19 is 30%, and a case where the light emission amount of the first LED 15 is 30% and the light emission amount of the second LED 19 is 70%.

If the respective light emission amount of the first LED 15 and the second LED 19 are made equal (each 50%), for example, emitted light having a peak luminance at a central position in the X-axis direction of the backlight device 12 is obtained, as illustrated in the graph indicated by the solid line in FIG. 6. Then, if the second LED 19 is not turned on and only the first LED 15 is turned on, emitted light having a peak luminance in the vicinity of the X2 end in the X-axis direction in the backlight device 12 is obtained, as illustrated in the graph indicated by the thin one-dot and dash line in FIG. 6. Contrary to this, if the first LED 15 is not turned on and only the second LED 19 is turned on, emitted light having a peak luminance in the vicinity of the X1 end in the X-axis direction in the backlight device 12 is obtained, as illustrated in the graph indicated by the thick one-dot and dash line in FIG. 6. Then, if the light emission amount of the first LED 15 is 70% and the light emission amount of the second LED 19 is 30%, emitted light having a peak luminance at an intermediate position between the central position and the X2 end in the X-axis direction in the backlight device 12 is obtained, as illustrated in the graph indicated by the thin two-dot and dash line in FIG. 6. Contrary to this, if the light emission amount of the first LED 15 is 30% and the light emission amount of the second LED 19 is 70%, emitted light having a peak luminance at an intermediate position between the central position and the X1 end in the X-axis direction in the backlight device 12 is obtained, as illustrated in the graph indicated by the thick two-dot and dash line in FIG. 6. As described above, when the respective light emission amounts of the first LED 15 and the second LED 19 are appropriately adjusted, a luminance distribution can be freely controlled by optionally moving a position at which emitted light has a peak luminance in the backlight device 12 in the X-axis direction. As a result, such control that the emitted light from, the backlight device 12 is locally increased becomes easy. Accordingly, this is favorable in realizing lighting obtained by enlarging a luminance difference referred to as an HDR (High Dynamic Range). Moreover, both the first LED 15 and the second LED 19 are of a top view type, and therefore are larger in light emission amount than LEDs of a side view type, which is more favorable in realizing a higher luminance and an HDR of the backlight device 12. Moreover, when the first reflection surface 17a of the first reflection member 17 is made to cross both the first light emission surface 15a of the first LED 15 and the first light entrance end surface 18a of the first light guide plate 18 while the second reflection surface 21a of the second reflection member 21 is made to cross both the second light emission surface 19a of the second LED 19 and the second light emission surface 22a of the second light guide plate 22, lights emitted from the first light emission surface 15a and the second light emission surface 19a can be respectively reflected by the first reflection surface 17a and the second reflection surface 21a, to be incident on the first light entrance end surface 18a and the second light entrance end surface 22a, which is favorable in thinning the first light guide plate 18 and the second light guide plate 22 as well as the backlight device 12.

The first reflection member 17 includes a first light guide plate overlapping section 34 that overlaps, on the side of the first light outgoing plate surface 18b, an end on the side of the first light entrance end surface 18a of the first light guide plate 18, as illustrated in FIG. 1. The first light guide plate overlapping section 34 protrudes toward the first light guide plate 18 in the X-axis direction from an inner end position (a position closest to the first light entrance end surface 18a) in the first reflection surface 17a, and its protruding distal end exceeds the first light entrance end surface 18a. As a result, the first light guide plate overlapping section 34 is arranged to overlap, on the front side, an end on the side of the first light entrance end surface 18a of the first light guide plate 18 and to be sandwiched between the above-described end of the first light guide plate 18 and an end on the side close to the second light entrance end surface 22a of the second light guide plate 22. On the other hand, the second reflection member 21 includes a second light guide plate overlapping section 35 that overlaps, on the side of the second light outgoing plate surface 22b, an end on the side of the second light entrance end surface 22a of the second light guide plate 22. The second light guide plate overlapping section 35 protrudes toward the second light guide plate 22 in the X-axis direction from an inner end position (a position closest to the second light entrance end surface 22a) in the second reflection surface 21a, and its protruding distal end exceeds the second light entrance end surface 22a. As a result, the second light guide plate overlapping section 35 overlaps, on the front side, an end on the side of the second light entrance end surface 22a of the second light guide plate 22. Accordingly, the first light guide plate overlapping section 34 and the second light guide plate overlapping section 35 respectively overlap the ends, on the side of the light entrance end surfaces 18a and 22a, of the light guide plates 18 and 22. Thus, even if lights incident on the light entrance end surfaces 18a and 22a respectively reach the light outgoing plate surfaces 18b and 22b at the above-described ends, the lights can be respectively reflected by the light guide plate overlapping sections 34 and 35 so that occurrence of direct emission can be avoided. As a result, luminous nonuniformity does not easily occur in the respective vicinities of the ends, on the side of the light entrance end surfaces 18a and 22a, of the light guide plates 18 and 22.

As described above, the backlight device (lighting device) 12 according to the present embodiment includes the first LED (first light source) 15 of a top view type having the first light emission surface 15a that emits light, the first light guide plate 18 having the first light entrance end surface 18a that is composed of a part of its outer peripheral end surface and on which light from the first LED 15 is incident and the first light outgoing plate surface 18b that is composed of one of its plate surfaces and emits light and including the first high luminance light outgoing region 28 that is composed of a part of the first light outgoing plate surface 18b and emits a relatively large amount of light and the first low luminance light outgoing region 29 that is composed of a part of the first light outgoing plate surface 18b and emits a relatively small amount of light, a first reflection member 17 having the first reflection surface 17a that opposes both the first light emission surface 15a and the first light entrance end surface 18a and reflects light emitted from the first light emission surface 15a toward the first light entrance end surface 18a, the second LED (second light source) 19 of a top view type having the second light emission surface 19a that emits light, the second light guide plate 22 having the second light entrance end surface 22a that is composed of a part of its outer peripheral end surface and on which light from the second LED 19 is incident and the second light outgoing plate surface 22b that is composed of one of its plate surfaces and emits light and overlapping the first light guide plate 18, and including the second high luminance light outgoing region 30 that is composed of a part of the second light outgoing plate surface 22b, overlaps the first low luminance light outgoing region 29, and emits a relatively large amount of light and the second low luminance light outgoing region 31 that is composed of a part of the second light outgoing plate surface 22b, overlaps the first high luminance light outgoing region 28, and emits a relatively small amount of light, and the second reflection member 21 having the second reflection surface 21a that opposes both the second light emission surface 19a and the second light entrance end surface 22a and reflects light emitted from the second light emission surface 19a toward the second light entrance end surface 22a.

Light emitted from the first light emission surface 15a of the first LED 15 is incident or the first light entrance end surface 18a of the first light guide plate 18 by being reflected on the first reflection surface 17a of the first reflection member 17. On the other hand, light emitted from the second light emission surface 19a of the second. LED 19 is incident on the second light entrance end surface 22a of the second light guide plate 22 by being reflected on the second reflection surface 21a of the second reflection member 21. Light from the first LED 15 incident on the first light guide plate 18 is emitted from the first light outgoing plate surface 18b after propagating through the first light guide plate 18. On the other hand, light from the second LED 19 incident on the second light guide plate 22 is emitted from the second light outgoing plate surface 22b after propagating through the second light guide plate 22. Although an amount of emitted light from the first high luminance light outgoing region 28 in the first light outgoing plate surface 18b of the first light guide plate 18 is relatively large, an amount of emitted light from the first low luminance light outgoing region 29 is relatively small. On the other hand, although an amount of emitted light from the second high luminance light outgoing region 30, which overlaps the first low luminance light outgoing region 29, in the second light outgoing plate surface 22b of the second light guide plate 22 is relatively large, an amount of emitted light from the second low luminance light outgoing region 31 that overlaps the first high luminance light outgoing region 26 is relatively small.

Accordingly, emitted light from the backlight device 12 includes respective; emitted lights from the first low luminance light outgoing region 29 and the second high luminance light outgoing region 30 that overlap each other and respective emitted lights from the first high luminance light outgoing region 28 and the second low luminance light outgoing region 31 that overlap each other. Therefore, when a light emission amount of the first LED 15 and a light emission amount of the second LED 19 are adjusted, a luminance distribution related to the emitted light from the backlight device 12 can be easily changed. As a result, such control that emitted light from the backlight device 12 is locally increased becomes easy. Accordingly, this is favorable in realizing lighting obtained by enlarging a luminance difference referred to as an HDR (High Dynamic Range).

Both the first LED 15 and the second LED 19 are of a top view type, and therefore are larger in light emission amount than LEDs of a side view type, which is more favorable in realizing a higher luminance and an HDR of the backlight device 12. Moreover, when the first reflection surface 17a of the first reflection member 17 is made to oppose both the first light emission surface 15a of the first LED 15 and the first light entrance end surface 18a of the first light guide plate 18 while the second reflection surface 21a of the second reflection member 21 is made to oppose both the second light emission surface 19a of the second LED 19 and the second light entrance surface 22a of the second light guide plate 22, lights emitted from the first light emission surface 15a and the second light emission surface 19a can be respectively reflected by the first reflection surface 17a and the second reflection surface 21a, to be incident on the first light entrance end surface 18a and the second light entrance end surface 22a, which is favorable in thinning the first light guide plate 18 and the second light guide plate 22 as well as the backlight device 12.

The backlight device 12 includes the first light outgoing reflection section 32 including the plural plurality of first unit reflection sections 32a that are provided on the plate surface of the first light guide plate 18 and reflect light to urge light outgoing from the first light outgoing plate surface 18b and the second light outgoing reflection section 33 including the plurality of second unit reflection sections 33a that are provided on the plate surface of the second light guide plate 22 and reflect light to urge light outgoing from the second light outgoing plate surface 22b. In the first light outgoing reflection section 32, the distribution density of the first unit reflection sections 32a is higher in the first high luminance light outgoing region 28 than that in the first low luminance light outgoing region 29. In the second light outgoing reflection section 33, the distribution density of the second unit reflection sections 33a is higher in the second high luminance light outgoing region 30 than that in the second low luminance light outgoing region 31. Accordingly, light incident on the first light guide plate 18 is reflected by the first unit reflection sections 32a constituting the first light outgoing reflection section 32 in a process of propagating through the first light guide plate 18 so that light outgoing from the first light outgoing plate surface 18b is urged. Similarly, light incident on the second light guide plate 22 is reflected by the second unit reflection sections 32a constituting the second light outgoing reflection section 33 in a process of propagating through the second light guide plate 22 so that light outgoing from the second light outgoing plate surface 22b is urged. Amounts of emitted lights from the first light outgoing plate surface 18b and the second light outgoing plate surface 22b are respectively in relationships proportional to the distribution densities of the first unit reflection sections 32a and the second unit reflection sections 33a constituting the first light outgoing reflection section 32 and the second light outgoing reflection section 33. Therefore, although the amount of emitted light from the first high luminance light outgoing region 28 having a relatively high distribution density of the first unit reflection sections 32a in the first light outgoing plate surface 18b of the first light guide plate 18 is relatively large, the amount of emitted light from the first low luminance light outgoing region 29 having a relatively high distribution density of the first unit reflection sections 32a is relatively small. On the other hand, although the amount of emitted light from the second high luminance light outgoing region 30, which overlaps the first low luminance light outgoing region 29 while having a relatively high distribution density of the second unit reflection sections 33a, in the second light outgoing plate surface 22b of the second light guide plate 22 is relatively large, the amount of emitted light from the second low luminance light outgoing region 31, which overlaps the first high luminance light outgoing region 28 while having a relatively low distribution density of the second unit reflection sections 33a, is relatively small. Accordingly, when the respective distribution densities of the first unit reflection sections 32a and the second unit reflection sections 33a are adjusted, the respective amounts of emitted lights from the first light outgoing plate surfaces 18b and the second light outgoing plate surface 22b can be controlled.

While the plurality of first LEDs 15 are lined up along the first light entrance end surface 18a, the plurality of second LEDs 19 are lined up along the second light entrance end surface 22a at positions spaced apart from the plurality of first. LEDs 15 in a normal direction of the first light entrance end surface 18a. Accordingly, respective distribution densities of the LEDs 15 and the LEDs 19 become higher than those when first LEDs and second LEDs are lined up, which is favorable in achieving a higher luminance.

The backlight device 12 includes the first LED substrate (first light source substrate) 16 on which the plurality of first LEDs 15 are mounted and the second LED substrate (second light source substrate) 20 on which the plurality of second LEDs 19 are mounted and that is arranged on a different level from the first LED substrate 16. Accordingly, when the second LED substrate 20 is arranged on a different level from the first LED substrate a distance between the respective first light emission surfaces 15a of the plurality of first LEDs 15 mounted on the first LED substrate 16 and the first reflection surface 17a of the first; reflection member 17 and a distance between the respective light emission surfaces 19a of the plural ty of second LEDs 19 mounted on the second LED substrate 20 and the second reflection surface 21a of the second reflection member 21 can be made equal to each other. As a result, this is favorable in equalizing an incidence efficiency of light on each of the respective light entrance end surfaces 18a and 22a of the light guide plates 18 and 22.

While the first reflection member 17 includes the first light guide plate overlapping section 34 that overlaps, on the side of the first light outgoing plate surface 18b, an end on the side of the first light entrance end surface 18a of the first light guide plate 18, the second reflection member 21 includes the second light guide plate overlapping section 35 that overlaps, on the side of the second light outgoing plate surface 22b, an end on the side of the second light entrance end surface 22a of the second light guide plate 22. Lights incident on the light entrance end surfaces 18a and 22a from the LEDs 15 and 19 may be respectively directly emitted from the light outgoing plate surfaces 18b and 22b at the ends, on the side of the light entrance end surfaces 18a and 22a, of the light guide plates 18 and 22. In this respect, the reflection members 17 and 21 respectively include the light guide plate overlapping sections 34 and 35 that overlap the ends, on the side of the light entrance end surfaces 18a and 22a, of the light guide plates 18 and 22. Thus, lights that have reached the light outgoing plate surfaces 18b and 22b at the ends, on the side of the light entrance end surfaces 18a and 22a, of the light guide plates 18 and 22 are respectively reflected by the light guide plate overlapping sections 34 and 35 so that occurrence of direct emission can be avoided. As a result, luminous nonuniformity does not easily occur in the respective vicinities of the ends, on the side of the light entrance end surfaces 18a and 22a, of the light guide plates 18 and 22.

The liquid crystal display device 10 according to the present embodiment includes the backlight device 12 as described above and the liquid crystal panel (display panel) 11 that displays an image using light to be irradiated from the backlight device 12. According to the liquid crystal display device 10 having such a configuration, the backlight device 12 that irradiates light onto the liquid crystal panel 11 is favorable in realizing an HDR. Thus, an excellent display quality is obtained.

Second Embodiment

A second embodiment of the present invention will be described with reference to FIG. 7. In the second embodiment, an alteration of an arrangement of the second LED 119, for example, is illustrated. An overlapping description is omitted for a similar structure, function, and effect to those in the above-described first embodiment.

Figure 7:
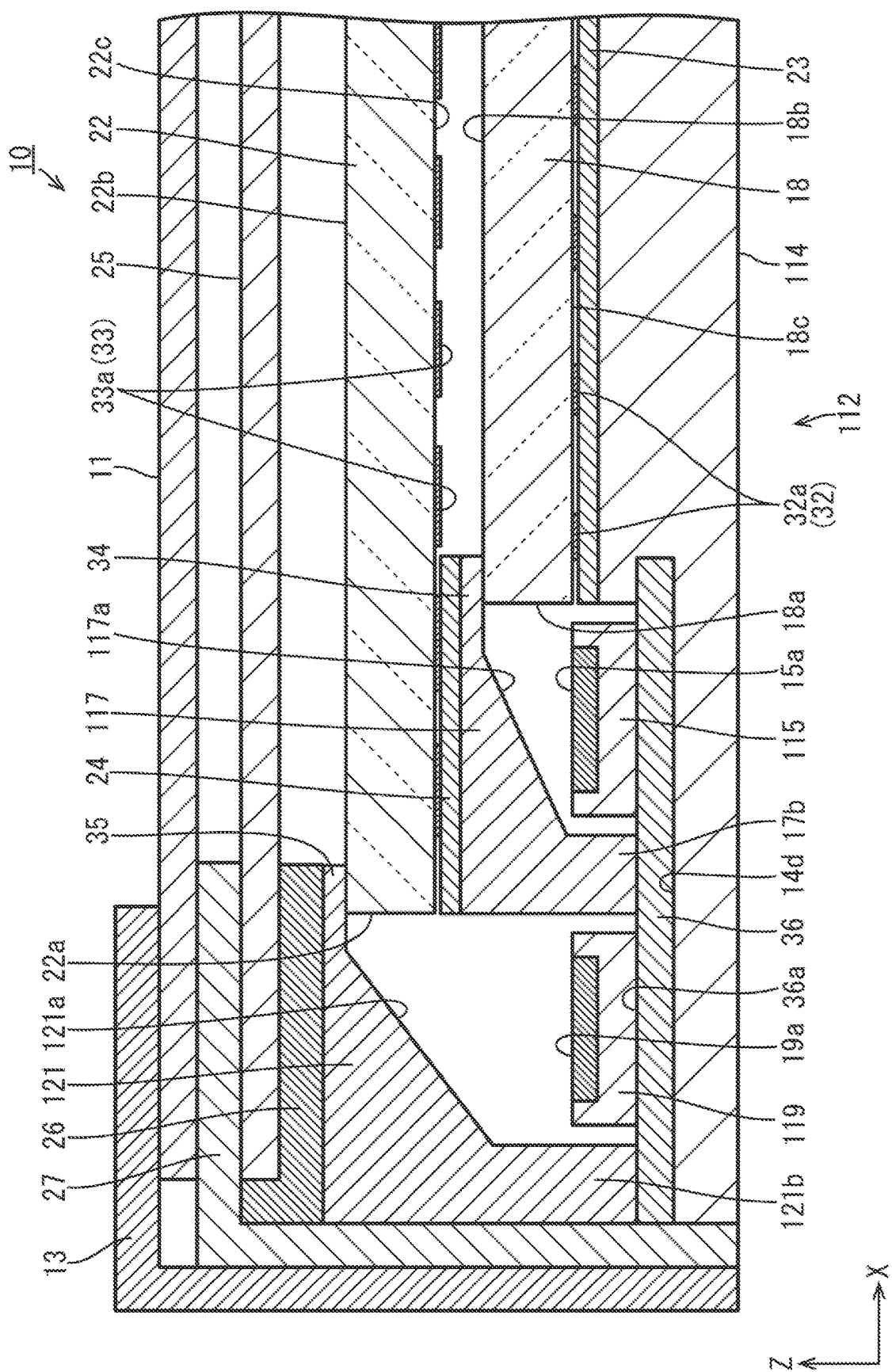
FIG. 7 is a side sectional view of a liquid crystal display device according to a second embodiment of the present invention.

A plurality of first LEDs 115 and a plurality of second LEDs 119 according to the present embodiment are mounted on a common LED substrate (common light source substrate) 36, as illustrated in FIG. 7. The common LED substrate 36 is attached to a chassis 114 in a form housed in a common LED substrate attachment recess 14d formed at an end in an X-axis direction of the chassis 114. The common LED substrate 36 is arranged to overlap both a first reflection member 117 and a second reflection member 121 in a form straddling both the reflection members, and the first LED 115 and the second LED 119 are respectively mounted on a position overlapping a first reflection surface 117a and a position overlapping a second reflection surface 121a in its mounting surface 36a. In the second reflection member 121, a second reflection member holding section 121b is more extended than that described in the above-described first embodiment, and accordingly a gradient of the second reflection surface 121a is also adjusted to be slightly steep. Accordingly, a distance from the second LED 119 to the second reflection surface 121a is larger than a distance from the first LED 115 to the first reflection surface 117a. When the first LED 115 and the second LED 119 are mounted on the same common LED substrate 36, as described above, the number of components in a backlight device 112 is reduced so that cost reduction can be achieved.

As described above, according to the present embodiment, the backlight device 112 includes the common LED substrate (common light source substrate) 36 on which the plurality of first LEDs 115 and the plurality of second LEDs 119 are mounted. This is more favorable in achieving cost reduction than when the plurality of first LEDs and the plurality of second LEDs are respectively mounted on different LED substrates.

Third Embodiment

A third embodiment of the present invention will be described with reference to FIG. 8 to FIG. 10. In the third embodiment, an alteration of an arrangement of the first LED 215 and the second LED 219, for example, from the above-described second embodiment is illustrated. An overlapping description is omitted for a similar structure, function, and effect to those in the above-described second embodiment.

Figure 8:
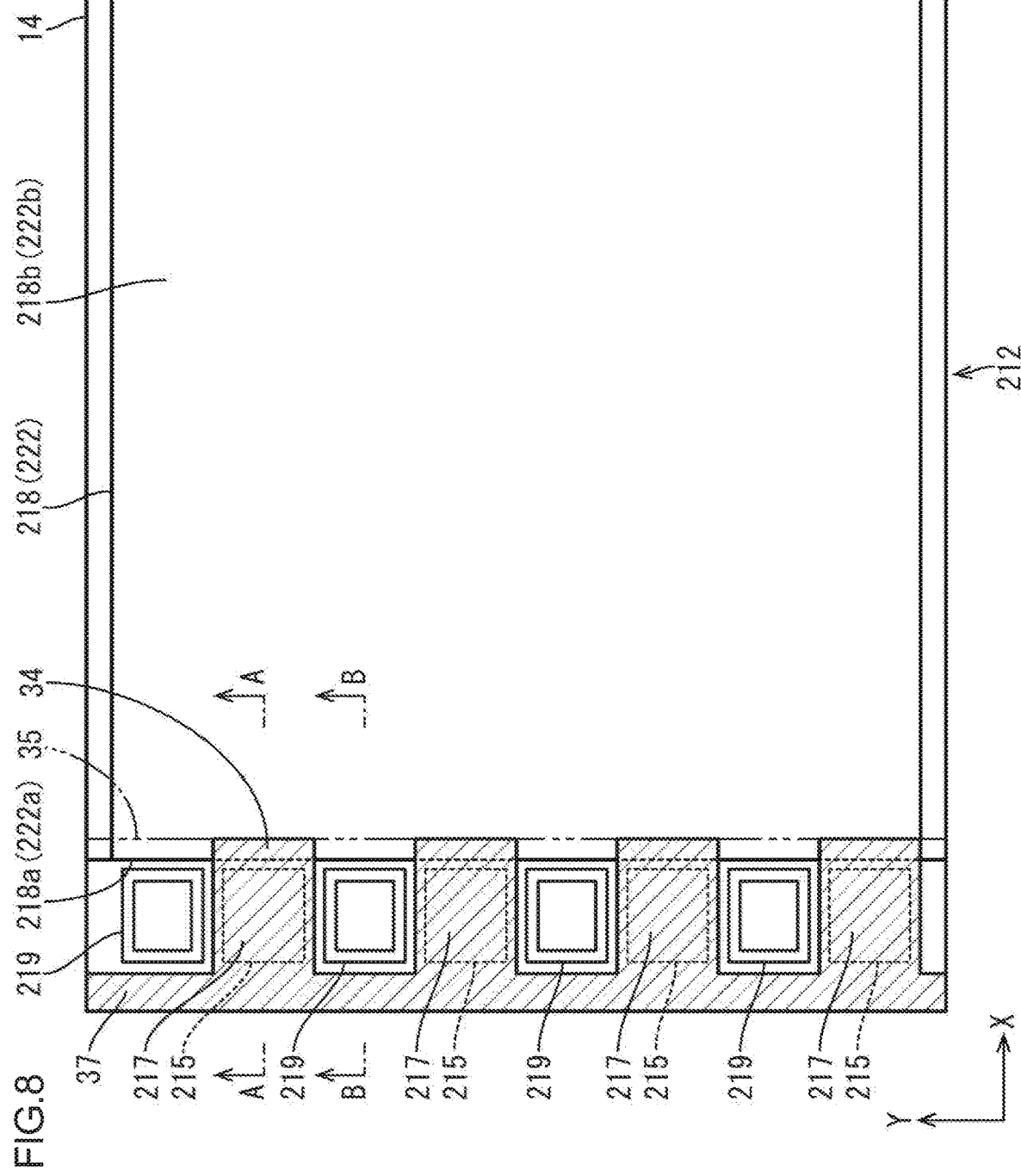
FIG. 8 is a plan sectional view of a backlight device constituting a liquid crystal display device according to a third embodiment of the present invention.
Figure 10:
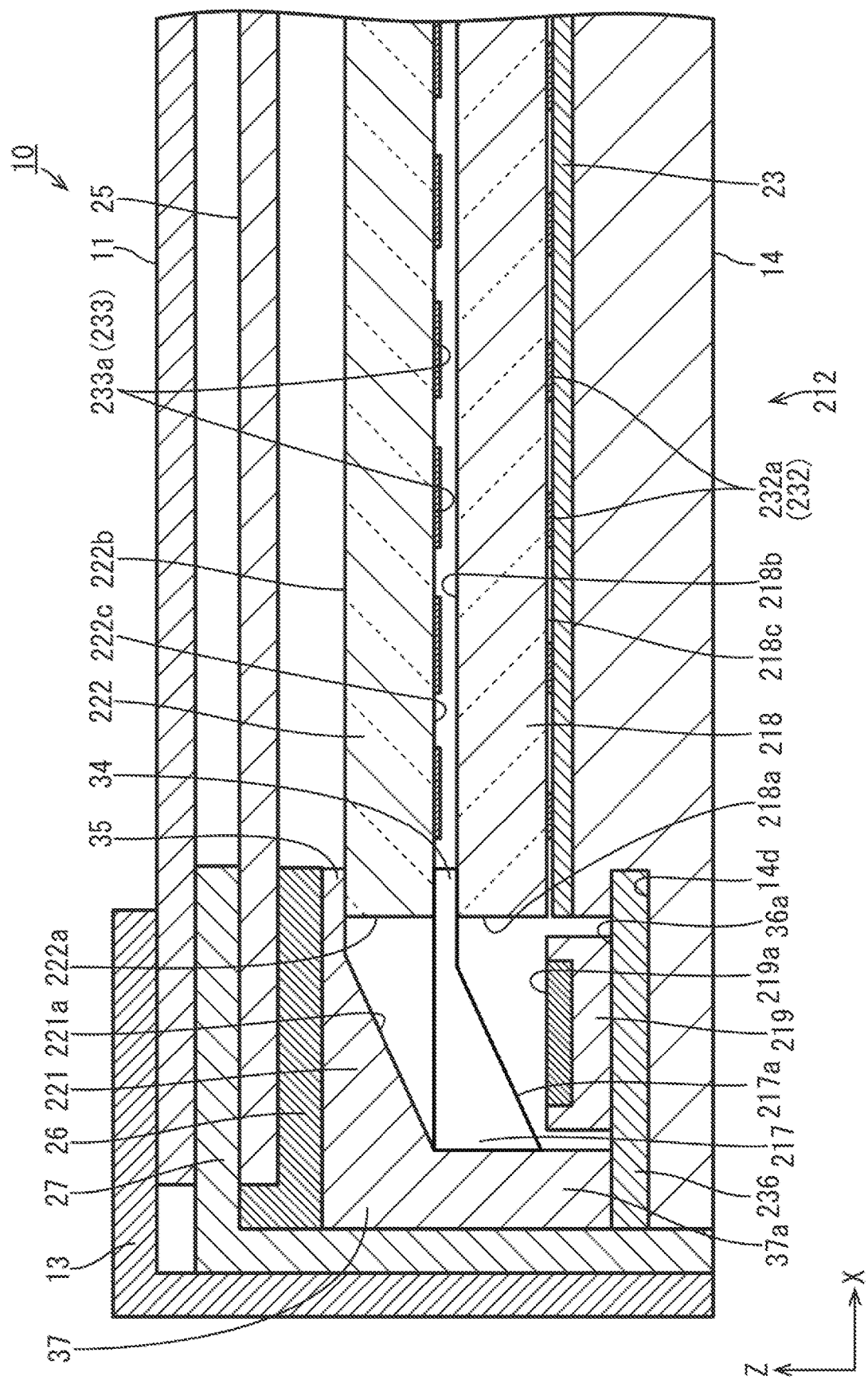
FIG. 10 is a cross-sectional view taken along a line B-B illustrated in FIG. 8.

A plurality of first LEDs 215 and a plurality of second LEDs 219 according to the present embodiment are mounted on a common LED substrate 236 in a form arranged in the same column in a Y-axis direction as a direction in which a first light entrance end surface 218a and a second light entrance end surface 222a extend, as illustrated in FIG. 8 and FIG. 10. Accordingly, an arrangement space in an X-axis direction of the first LEDs 215 and the second LEDs 219 can be made narrower than when the first LEDs and the second LEDs are respectively individually lined up, like in the above-described first and second embodiments, which is favorable in narrowing a frame of a backlight device 212. Moreover, the plurality of first LEDs 215 and the plurality of second LEDs 219 are arranged alternately one by one and repeatedly. Accordingly, luminous nonuniformity does not more easily occur in the respective vicinities of ends, on the side of the LEDs 215 and 219, of light outgoing plate surfaces 218b and 222b of light guide plates 218 and 222 than when one or more of the first LEDs and one or more of the second LEDs are repeatedly arranged.

Figure 9:
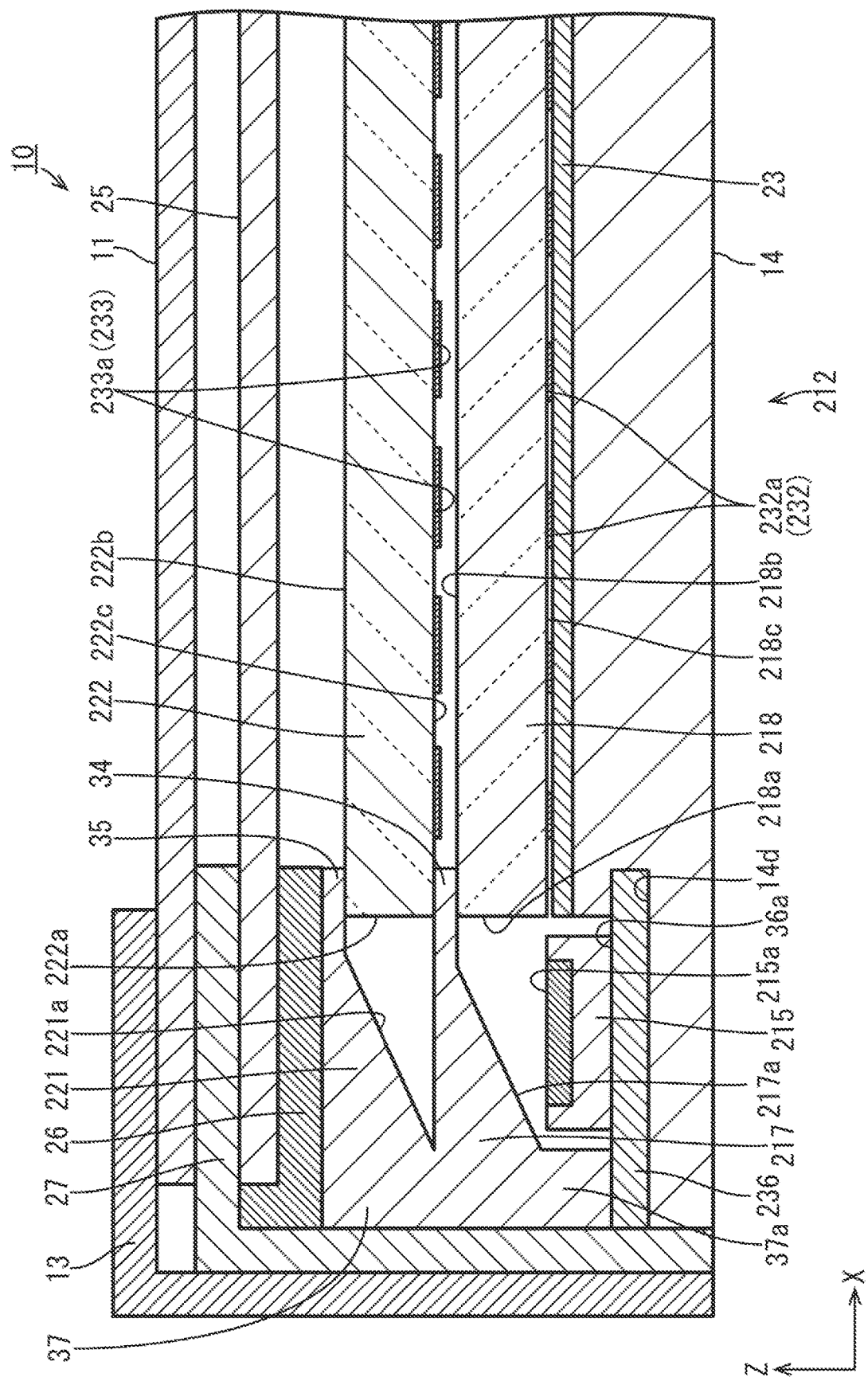
FIG. 9 is a cross-sectional view taken along a line A-A illustrated in FIG. 8.

As both the LEDs 215 and the LEDs 219 are arranged as described above, the backlight device 212 according to the present embodiment includes a common reflection member 37 obtained by integrating a first reflection member 217 and a second reflection member 221, as illustrated in FIG. 9 and FIG. 10. The common reflection member 37 includes a first reflection surface 217a that reflects light from the first LED 215 and makes the light incident on the first light entrance end surface 218a of the first light guide plate 218 and a second reflection surface 221a that reflects light from the second LED 219 and makes the light incident on the second light entrance end surface 222a of the second light guide plate 222. The common reflection member 37 is provided with the first reflection surface 217a and the second reflection surface 221a in a form arranged in the same column in the Y-axis direction as the direction in which the first light entrance end surface 218a and the second light entrance end surface 222a extend. More specifically, the second reflection member 221 having the second reflection surface 221a is provided in a form substantially extending over an entire length in the Y-axis direction in the common reflection member 37. On the other hand, the first reflection member 217 having the first reflection surface 217a includes a plurality of first reflection members 217 (the same number of first reflection members 217 as that of the first LEDs 215) disposed nearer the common LED substrate 236 than the second reflection member 221 in a Z-axis direction while being provided in a form arranged with a predetermined spacing in the Y-axis direction in the common reflection member 37, as illustrated in FIG. 8 and FIG. 9. The common reflection member 37 includes a common reflection member holding section 37a that holds the common reflection member 37 by abutting on the common LED substrate 236. According to such a configuration, lights emitted from a first light emission surface 215a and a second light emission surface 219a of the first LED 215 and the second LED 219 arranged in the same column in the Y-axis direction can be respectively incident on the first light entrance end surface 218a and the second light entrance end surface 222a by being reflected on the first reflection surface 217a and the second reflection surface 221a arranged in the same column. The common reflection member 37 obtained by integrating the first reflection member 217 and the second reflection member 221 is one component, which is favorable in achieving cost reduction.

The first light guide plate 218 and the second light guide plate 222 are disposed such that the first light entrance end surface 218a and the second light entrance end surface 222a are flush with each other, as illustrated in FIG. 9 and FIG. 10, and therefore have a relationship in which their respective entire areas overlap with each other. A distribution of first unit reflection sections 232a in a first light outgoing reflection section 232 provided in a first light outgoing opposite plate surface 218c of the first light guide plate 218 and a distribution of second unit reflection sections 233a in a second light outgoing reflection section 233 provided in a second light outgoing opposite plate surface 222c of the second light guide plate 222 are in a symmetrical relationship in the X-axis direction. Accordingly, the first light guide plate 218 and the second light guide plate 222 are set as the same component, and can be respectively used by being reversely arranged, which is favorable in achieving cost reduction.

As described above, according to the present embodiment, the first LEDs 215 and the second LEDs 219 are arranged in the same column along the first light entrance end surface 218a and the second light entrance end surface 222a. Accordingly, an arrangement space of the first LEDs 215 and the second LEDs 219 can be made narrower than when the first LEDs and the second LEDs are respectively individually lined up. Accordingly, this is favorable in achieving a narrower frame of the backlight device 212.

The plurality of first LEDs 215 and the plurality of second LEDs 219 are provided and are alternately and repeatedly arranged. Accordingly, luminous nonuniformity does not more easily occur in the respective vicinities of the ends, on the side of the LEDs 215 and 219, of the light outgoing plate surfaces 218a and 222a of the light guide plates 218 and 222 than when one or more of the first LEDs and one or more of the second LEDs are repeatedly arranged.

The backlight device 212 includes the common reflection member 37 obtained by integrating the first reflection member 217 and the second reflection member 221, where the first reflection surface 217a and the second reflection surface 221a are lined up along the first light entrance end surface 218a and the second light entrance end surface 222a. Accordingly, lights emitted from the first light emission surface 215a and the second light emission surface 219a of the first LED 215 and the second LED 219 lined up can be respectively incident on the first light entrance end surface 218a and the second light entrance end surface 222a by being reflected on the first reflection surface 217a and the second reflection surface 221a lined up. The common reflection member 37 obtained by integrating the first reflection member 217 and the second reflection member 221 is one component, which is favorable in achieving cost reduction.

The distribution of the first unit reflection sections 232a in the first light outgoing reflection section 232 and the distribution of the second unit reflection sections 232a in the second light outgoing reflection section 233 are in a symmetrical relationship. Accordingly, the first light guide plate 18 and the second light guide plate 222 are set as the same component, and can be respectively used by being reversely arranged, which is favorable in achieving cost reduction.

Fourth Embodiment

A fourth embodiment of the present invention will be described with reference to FIG. 11 and FIG. 12. In the fourth embodiment, an alteration of the respective structures of the first light guide plate 318 and the second light guide plate 322 from the above-described third embodiment is illustrated. An overlapping description is omitted for a similar structure, function, and effect to those in the above-described third embodiment.

Figure 11:
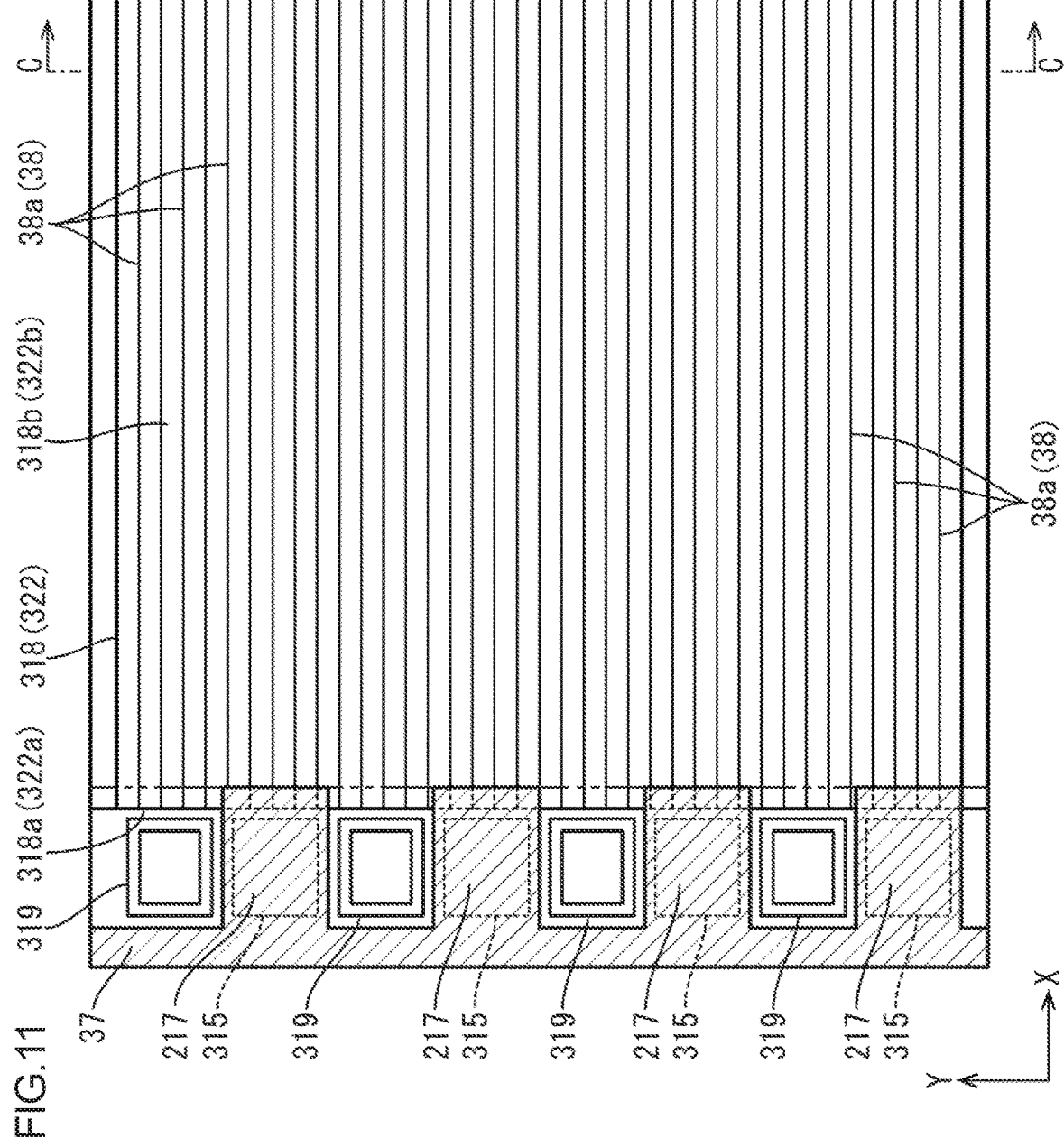
FIG. 11 is a plan view of a backlight device constituting a liquid crystal display device according to a fourth embodiment of the present invention.
Figure 12:
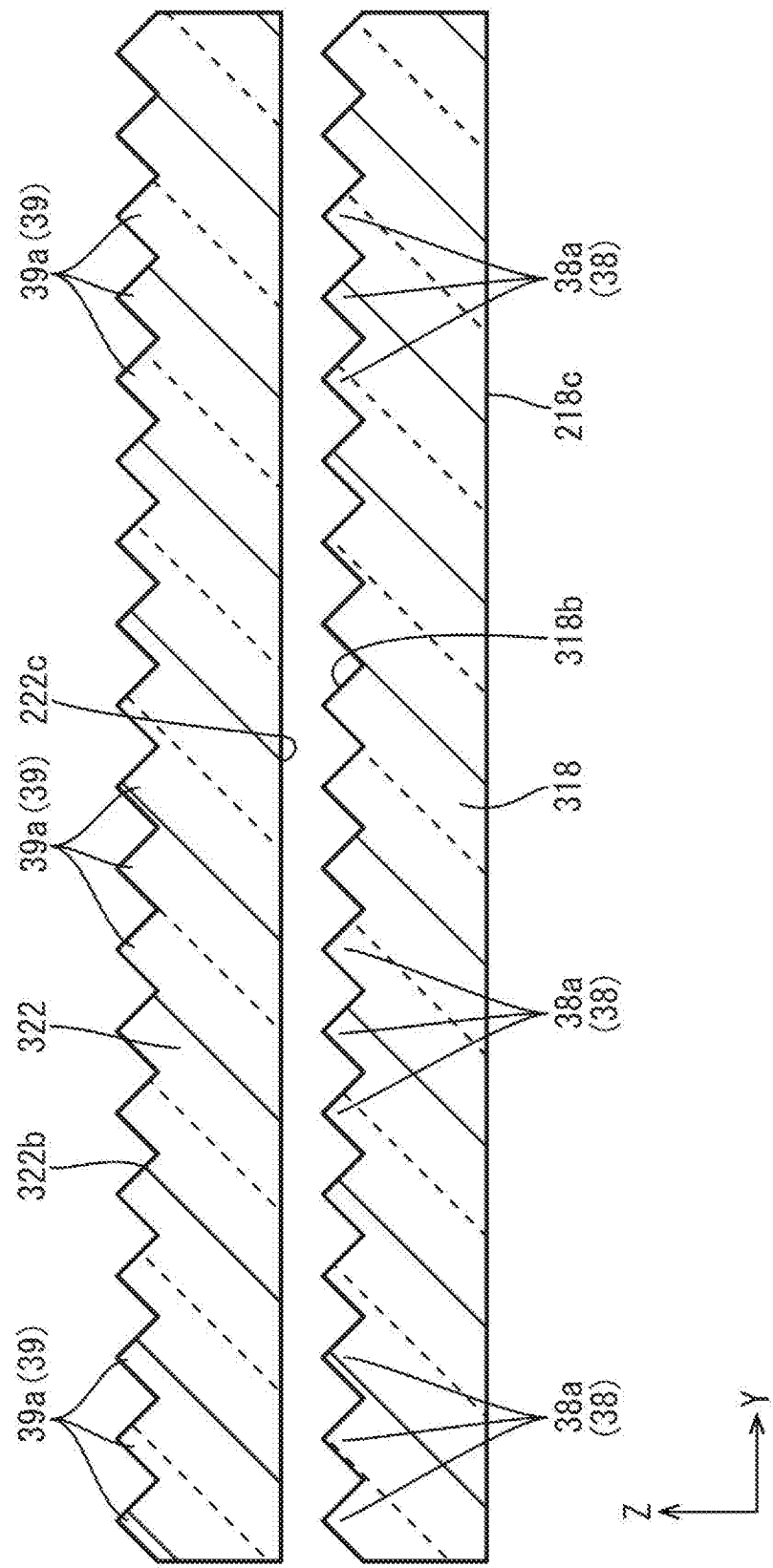
FIG. 12 is a cross-sectional view taken along a line C-C illustrated in FIG. 11.

Light outgoing; plate surfaces 318b and 322b of a first light guide plate 318 and a second light guide plate 322 according to the present embodiment are respectively provided with a first light collection section (first prism section) 38 and a second light collection section (second prism section) 39 that each provide a light collection function to emitted light, as illustrated in FIG. 11 and FIG. 12. The first light collection section 38 and the second light collection section 39 respectively include a plurality of first unit g collection sections (first unit prisms) 38a and a plurality of second unit light collection sections (second unit prisms) 39a that protrude toward the front side in a Z-axis direction from the light outgoing plate surfaces 318b and 322b. The first unit light collection sections 38a and the second unit light collection sections 39a have substantially mountain shapes as their respective cross sectional shapes cut in an X-axis direction (a direction in which LEDs 315 and LEDs 319 are arranged and a direction perpendicular to a normal direction of each of light entrance end surfaces 318a and 322a) while linearly extending in a Y-axis direction (a normal direction of each of the light entrance end surfaces 318a and 322a), and one or more of the first unit light collection sections 38a and one or more of the second unit light collection sect-on 39a are respectively arranged with substantially no gap in the X-axis direction in the light outgoing plate surfaces 318a and 322b. Each of the unit light collection sections 38a and 39a has a triangular shape as its cross-sectional shape cut in the X-axis direction, and has a pair of inclined surfaces with a vertex sandwiched therebetween. The unit light collection sections 38a and 39a respectively have substantially the same vertex angles of approximately 90 degrees, for example, while respectively having substantially the same arrangement spacings (arrangement pitches) in the Y-axis direction. According to such a configuration, a light collecting function is selectively provided by the plurality of unit light collection sections 38a and the plurality of unit light collection sections 39a respectively constituting the light collection sections 38 and 39 in the Y-axis direction (in a direction in which the unit light collection sections 38a and the unit light collection sections 39a are each arranged) to lights that have reached the light outgoing plate surfaces 318b and 322b after propagating through the light guide plates 318 and 322. As a result, lights that respectively propagate through the light guide plates 318 and 322 each have linearity for traveling in the X-axis direction. Thus, lights respectively emitted from the plurality of LEDs 315 and the plurality of LEDs 319 arranged in the Y-axis direction (in a direction in which each of the light entrance end surfaces 318a and 322a extends) are easily emitted from specific ranges in the Y-axis direction in the light outgoing plate surfaces 318b and 322b. Therefore, when respective light emission amounts of the plurality of LEDs 315 and the plurality of LEDs 319 arranged in the Y-axis direction are adjusted, respective amounts of emitted lights can be controlled for the specific ranges in the Y-axis direction in the light outgoing plate surfaces 318b and 322b.

As described above, according to the present embodiment, the plurality of first LEDs 315 and the plurality of second LEDs 319 are respectively disposed along the first light entrance end surface 318a and the second light entrance end surface 322a. The first light guide plate 318 is provided with the first light collection section 38 including the plurality of first unit light collection sections 38a that extend in the normal direction of the first light entrance end surface 318a in the first light outgoing plate surface 318b while being arranged in the direction in which the first LEDs 315 are arranged. On the other hand, the second light guide plate 322 is provided with the second light collection section 39 including the plurality of second unit light collection sections 39 that extend in the normal direction of the second light entrance end surface 322a in the second light outgoing plate surface 322b while being arranged in the direction in which the second LEDs 319 are arranged. Accordingly, a light collecting function is selectively provided in the directions in which the plurality of units light collection sections 38a and the plurality of unit light collection sections 39a constituting the light collection sections 38 and 39 are respectively arranged by the unit light collection sections 38a and the unit light collection sections 39a to lights that have reached the light outgoing plate surfaces 318b and 322b after propagating through the light guide plates 318 and 322. As a result, lights that respectively propagate through the light guide plates 318 and 322 each have linearity for traveling in the normal direction of each of the light entrance end surfaces 318a and 322a. Thus, lights respectively emitted from the plurality of LEDs 315 and the plurality of LEDs 319 arranged along the light entrance end surfaces 318a and 322a are easily emitted from specific ranges in the directions in which the unit light collection sections 38a and 39a are arranged in the light incident plate surfaces 318b and 322b. Therefore, when respective light emission amounts of the plurality of LEDs 315 and the plurality of LEDs 319 arranged along the light entrance end surfaces 318a and 322a are adjusted, respective amounts of emitted lights can be controlled for the specific ranges in the directions in which the unit light collection sections 38a and 39a are arranged in the light outgoing plate surfaces 318b and 322b.

Fifth Embodiment

Figure 13:
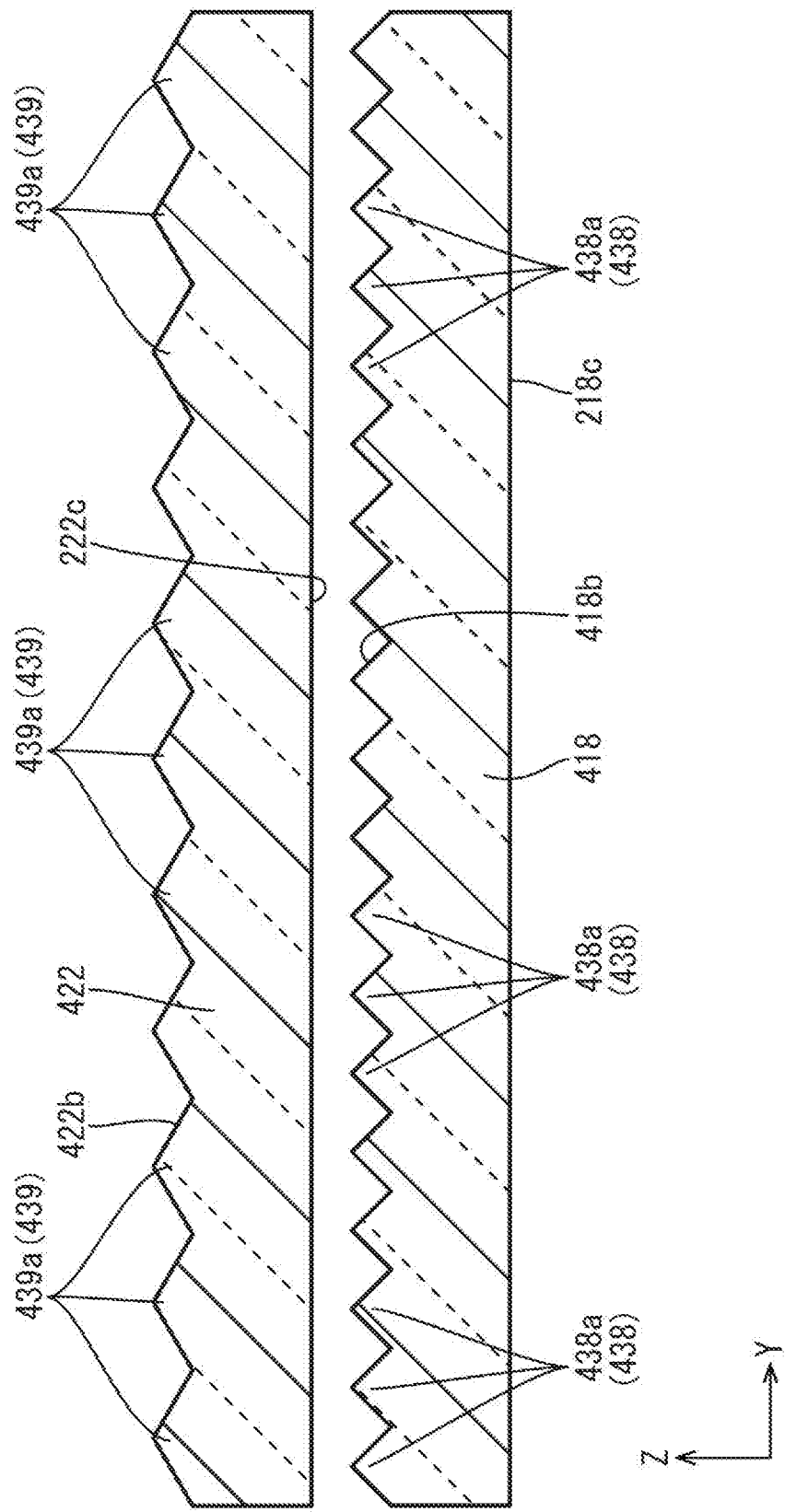
FIG. 13 is a front sectional view of each of light guide plates included in a backlight device constituting a liquid crystal display device according to a fifth embodiment of the present invention.

A fifth embodiment of the present invention will be described with reference to FIG. 13. In the fifth embodiment, an alteration of the configuration of the second light collection section 439 from the above-described fourth embodiment is illustrated. An overlapping description is omitted for a similar structure, function, and effect to those in the above-described fourth embodiment.

In a second light collection section 439 according to the present embodiment, a cross-sectional shape and an arrangement spacing of second unit light collection sections 439a differ from a cross-sectional shape and an arrangement spacing of first unit light collection sections 438a in a first light collection section 438. More specifically, a vertex angle of the second unit light collection sections 439a is made larger than a vertex angle (90 degrees) of the first unit light collection sections 438a while an arrangement spacing in a Y-axis direction of the second unit light collection sections 439a is made wider than the arrangement spacing of the first unit light collection sections 438a. Accordingly, a light collecting function to be provided by the first unit light collection sections 438a to light that has reached a first light outgoing plate surface 418a by propagating through a first light guide plate 418 and a light collecting function to be provided by the second unit light collection section 439a to light that has reached a second light outgoing plate surface 422b by propagating through a second light guide plate 422 are not the same. Particularly, when the arrangement spacing of the second unit light collection sections 439a constituting the second light collection section 439 is made relatively wide, a light collecting function is not easily provided again by the second light collection section 439 after light emitted from the first light outgoing plate surface 418b is transmitted by the second light guide plate 422. As a result, an interference does not easily occur between emitted light from the first light outgoing plate surface 418b and emitted light from the second light outgoing plate surface 422b.

As described above, according to the present embodiment, the first light correction section 438 and the second light collection section 439 respectively differ in at least one of the cross-sectional shape and the arrangement spacing of the first unit light collection sections 438a and at least one of the cross-sectional shape and the arrangement spacing of the second unit light collection section 439a. Accordingly, the light collecting function to be provided by the first unit light collection sections 438a to light that has reached the first light outgoing plate surface 418a by propagating through the first light guide plate 418 and the light collecting function to be provided by the second unit light collection section 439a to light that has reached the second right outgoing plate surface 422b by propagating through the second right guide plate 422 are not the same. As a result, an interference does not easily occur between emitted light from the first light outgoing plate surface 418b and emitted light from the second light outgoing plate surface 422b.

Sixth Embodiment

A sixth embodiment of the present invention will be described with reference to FIG. 14 or FIG. 15. In the sixth embodiment, an addition of a third LED 40, a third reflection member 41, a third light guide plate 42, and the like to the configuration described in the above-described third embodiment is illustrated. An overlapping description is omitted for a similar structure, function and effect to those in the above-described third embodiment.

Figure 14:
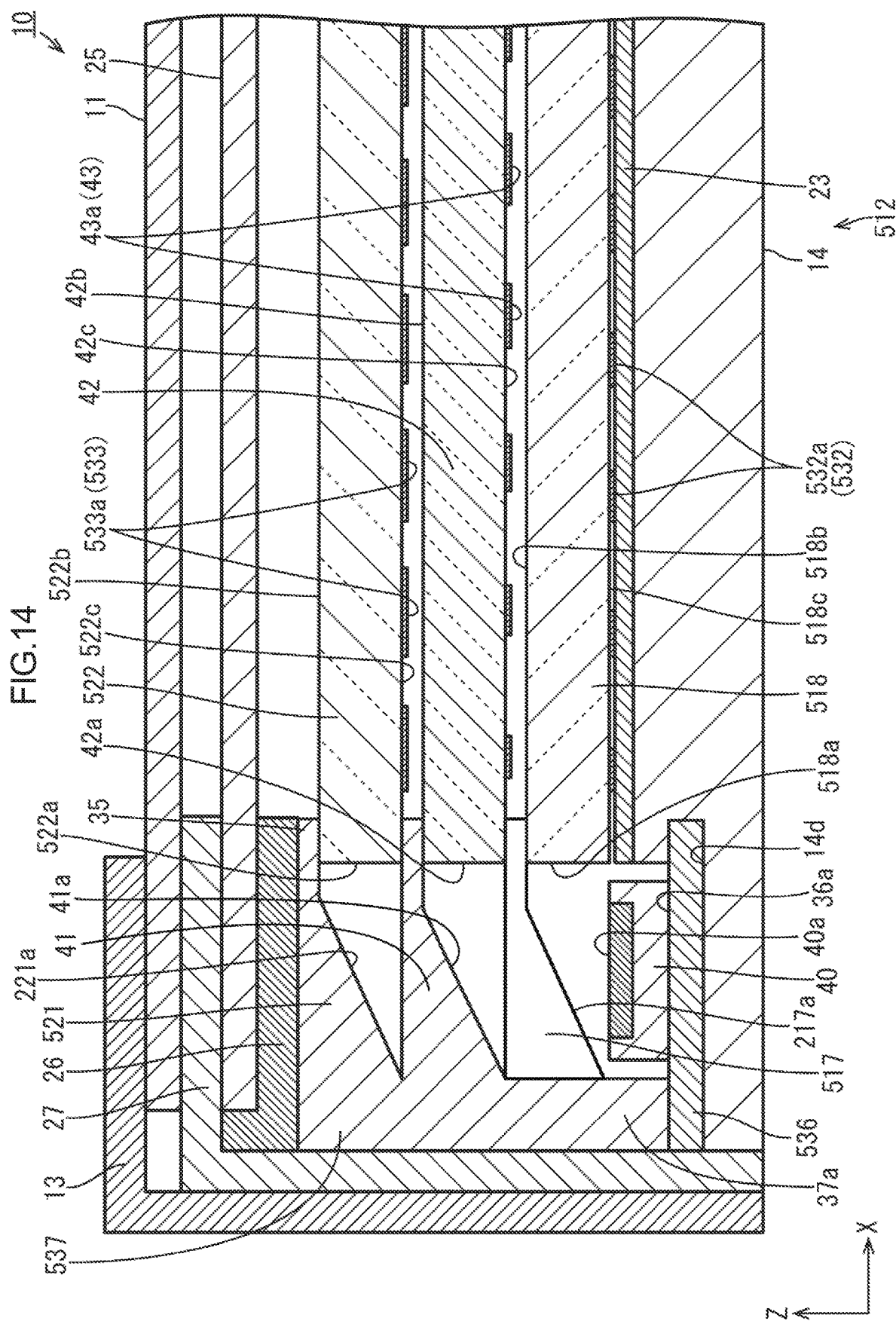
FIG. 14 is a side sectional view of a liquid crystal display device according to a sixth embodiment of the present invention.

On a common LED substrate 536 according to the present embodiment, the third LED 40 is mounted in addition to a first LED and a second LED (illustration of which is omitted in the present embodiment), as illustrated in FIG. 14. The third LED 40, together with the first LED and the second LED, includes a plurality of third LEDs 40 in a form alternately and repeatedly lined up in a Y-axis direction. A common reflection member 537 is integrally provided with the third reflection member 41 having a third reflection surface 41a that reflects light emitted from a third light emission surface 40a of the third LED 40 in addition to a first reflection member 517 and a second reflection member 521. The third reflection member 41 is disposed at a position interposed between the first reflection member 517 and the second reflection member 521 in a z-axis direction. Further, the third light guide plate 42 is disposed in a form interposed between a first light guide plate 518 and a second light guide plate 522 in the Z-axis direction. The third light guide plate 42 has a third light entrance end surfaces 42a that is flush with a first light entrance end surface 518a and a second light entrance end surface 522a and on which light from the third LED 40 reflected by the third reflection surface 41a is incident. The third light guide plate 42 has a third light outgoing plate surface 42b that has a shape opposing a second light outgoing reflection plate surface 522c of the second light guide plate 522 and from which light that has propagated therethrough is emitted. The third light guide plate 42 has a third light outgoing opposite plate surface 42c that has a shape opposing a first light outgoing plate surface 518b of the first light guide plate 518. The third light outgoing opposite plate surface 42c of the third light guide plate 42 is provided with a third light outgoing reflection section 43 including many third unit reflection sections 43a that reflect light to urge light outgoing from the third light outgoing plate surface 42b.

Figure 15:
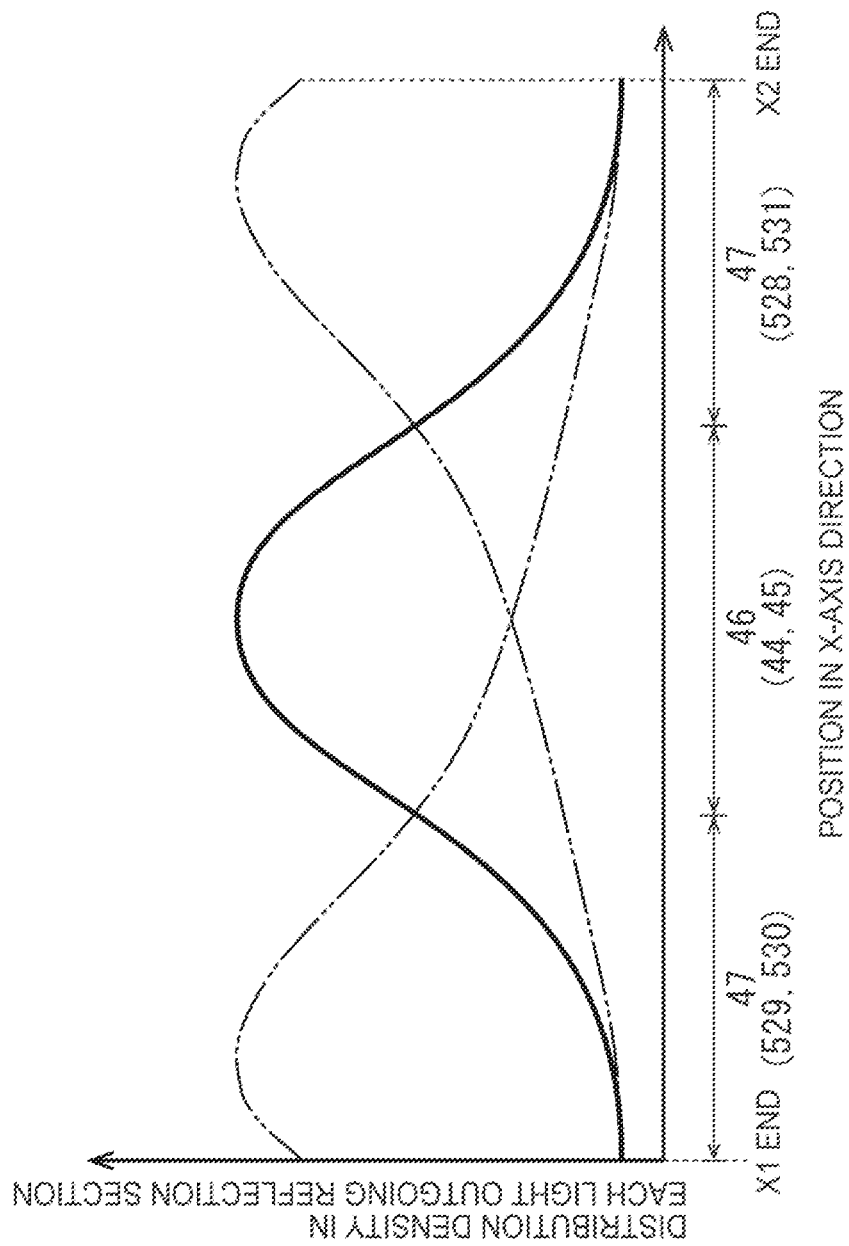
FIG. 15 is a graph illustrating a change in a distribution density of unit reflection sections constituting each of respective light outgoing reflection sections from an X1 end to an X2 end in light outgoing opposite plate surfaces of light guide plates.

In a backlight device 512 having the above-described configuration, a first light outgoing reflection section 532 is patterned such that a first intermediate luminance light outgoing region 44 that emits a smaller amount of light than that of a first high luminance light outgoing region 528 but emits a larger amount of light than that of a first low luminance light outgoing region 529 is included in addition to the first high luminance light outgoing region 528 and the first low luminance light outgoing region 529, as illustrated in FIG. 15, in a first light outgoing plate surface 518b of the first light guide plate 518. Similarly, a second light outgoing reflection section 533 is patterned such that a second intermediate luminance light outgoing region 45 that emits a smaller amount of light than that of a second high luminance light outgoing region 530 but emits a larger amount of light than that of a second low luminance light outgoing region 531 is included in addition to the second high luminance light, outgoing region 530 and the second low luminance light outgoing region 531 in a second light outgoing plate surface 522b of the second light guide plate 522. The third light outgoing reflection section 43 is patterned such that a third high luminance light outgoing region 46 that emits a relatively large amount of light and a pair of third low luminance light outgoing regions 47 that emits a relatively small amount of light are included in a third light outgoing plate surface 42b of the third light guide plate 42. FIG. 15 is a similar graph to FIG. 5, where a graph related to the third light outgoing reflection section 43 and a graph related to the first light outgoing reflection section 532 and the second light outgoing reflection section 533 are respectively indicated by a solid line and a two-dot and dash line, and regions other than the third high luminance light outgoing region 46 and the second low luminance light outgoing region 47 are each indicated in parentheses. The first intermediate luminance light outgoing region 44 and the second intermediate luminance light outgoing region 45 are respectively disposed at intermediate positions in an X-axis direction of the first light outgoing plate surface 518b and the second light outgoing plate surface 522b while overlapping each other. On the other hand, the third high luminance light outgoing region 46 is disposed at an intermediate position in the X-axis direction of the third light outgoing plate surface 42b while overlapping the first intermediate luminance light outgoing region 44 and the second intermediate luminance light outgoing region 45. The pair of third low luminance light outgoing regions 47 is disposed on both end sides (the side of the third light entrance end surface 42a and the opposite side thereto) in a form sandwiching the third high luminance light outgoing region 46 therebetween in the X-axis direction. One of the third low luminance light outgoing regions 47 overlaps the first high luminance light outgoing region 528 and the second low luminance light outgoing region 531, and the other third low luminance light outgoing region 47 overlaps the first low luminance light outgoing region 529 and the second high luminance light outgoing region 530. According to the above-described configuration, when respective light emission amounts of the first LED, the second LED, and the third LED 40 are adjusted, a luminance distribution in the X-axis direction related to emitted light from the backlight device 512 can be more easily changed.

Seventh Embodiment

A seventh embodiment of the present invention will be described with reference to FIG. 16 to FIG. 19. In the seventh embodiment, an alteration of the backlight device 612 to a backlight device of a both-side light entrance type from the above-described third embodiment is illustrated. An overlapping description is omitted for a similar structure, function, and effect to those in the above-described first embodiment.

Figure 16:
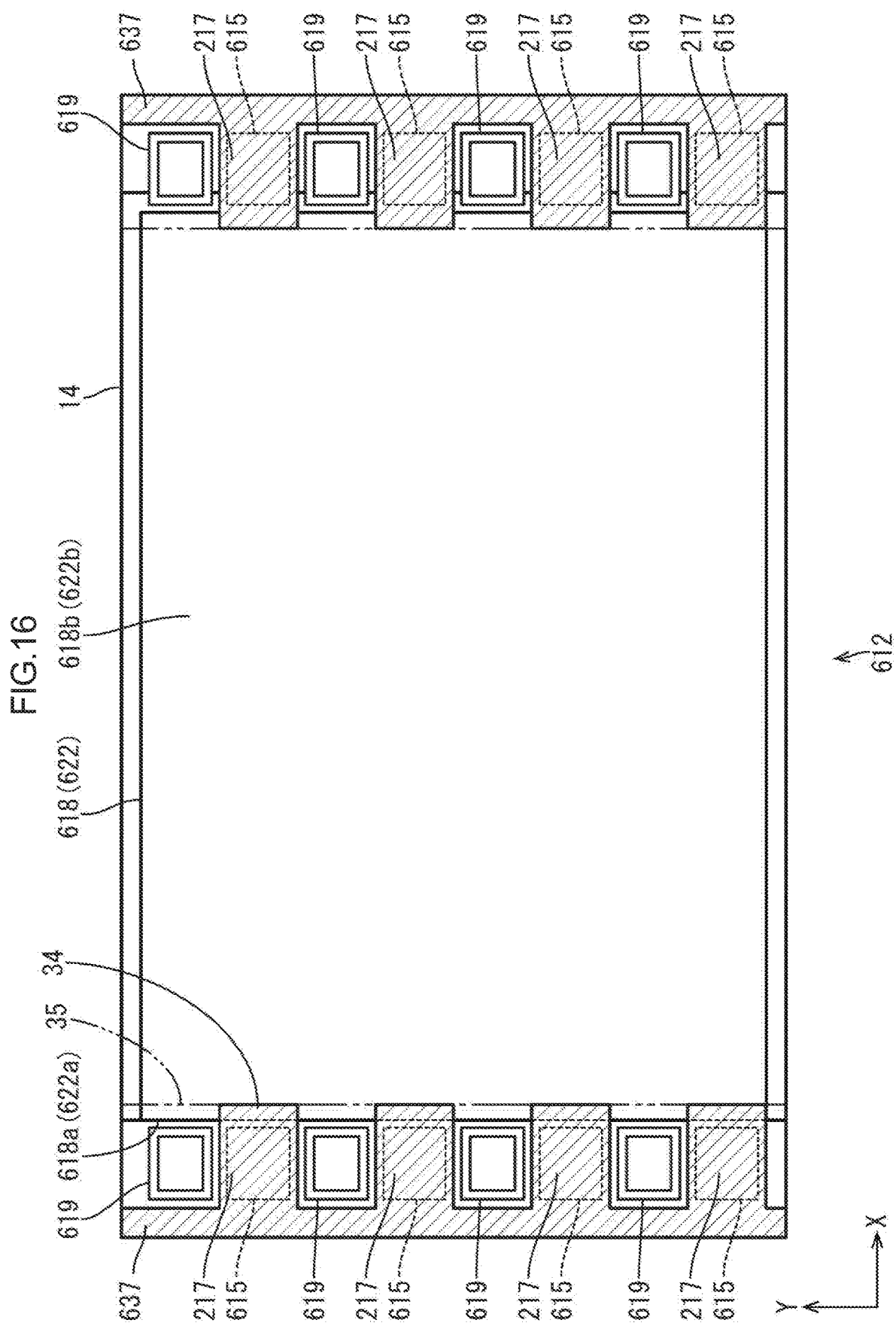
FIG. 16 is a plan sectional view of a backlight device constituting a liquid crystal display device according to a seventh embodiment of the present invention.

A backlight device 612 according to the present embodiment is of a so-called both-side light entrance type in which first LEDs 615 and second LEDs 619 are disposed in a form sandwiching each of a first light guide plate 618 and a second light guide plate 622 therebetween from both sides in an X-axis direction, as illustrated in FIG. 16. Therefore, the first light guide plate 618 and the second light guide plate 622 respectively include a pair of first light entrance end surfaces 618a and a pair of second light entrance end surfaces 622a. The backlight device 612 includes a pair of common LED substrates and a pair of common reflection members 637.

Figure 17:
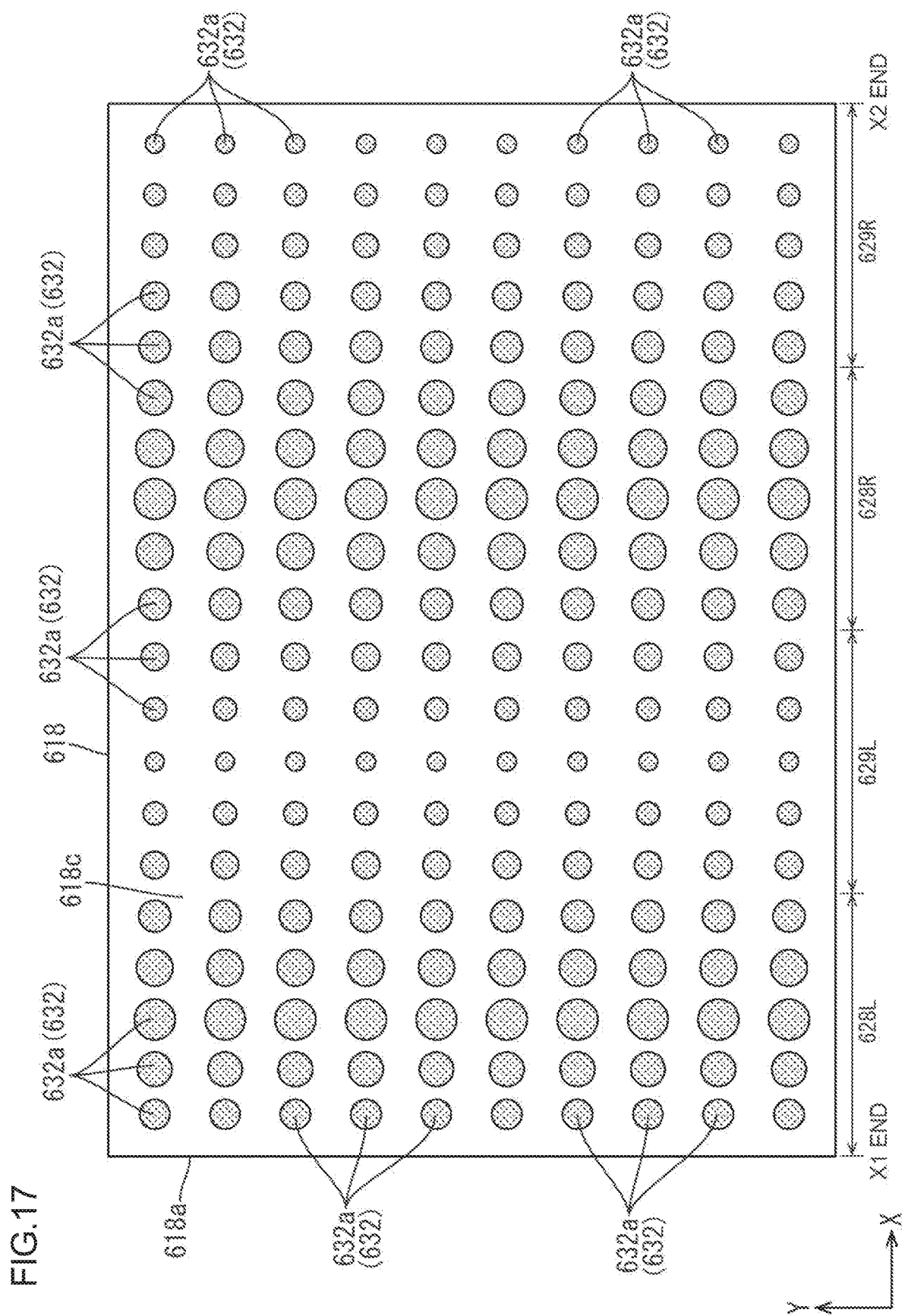
FIG. 17 is a bottom view of a first light guide plate constituting the backlight device.
Figure 19:
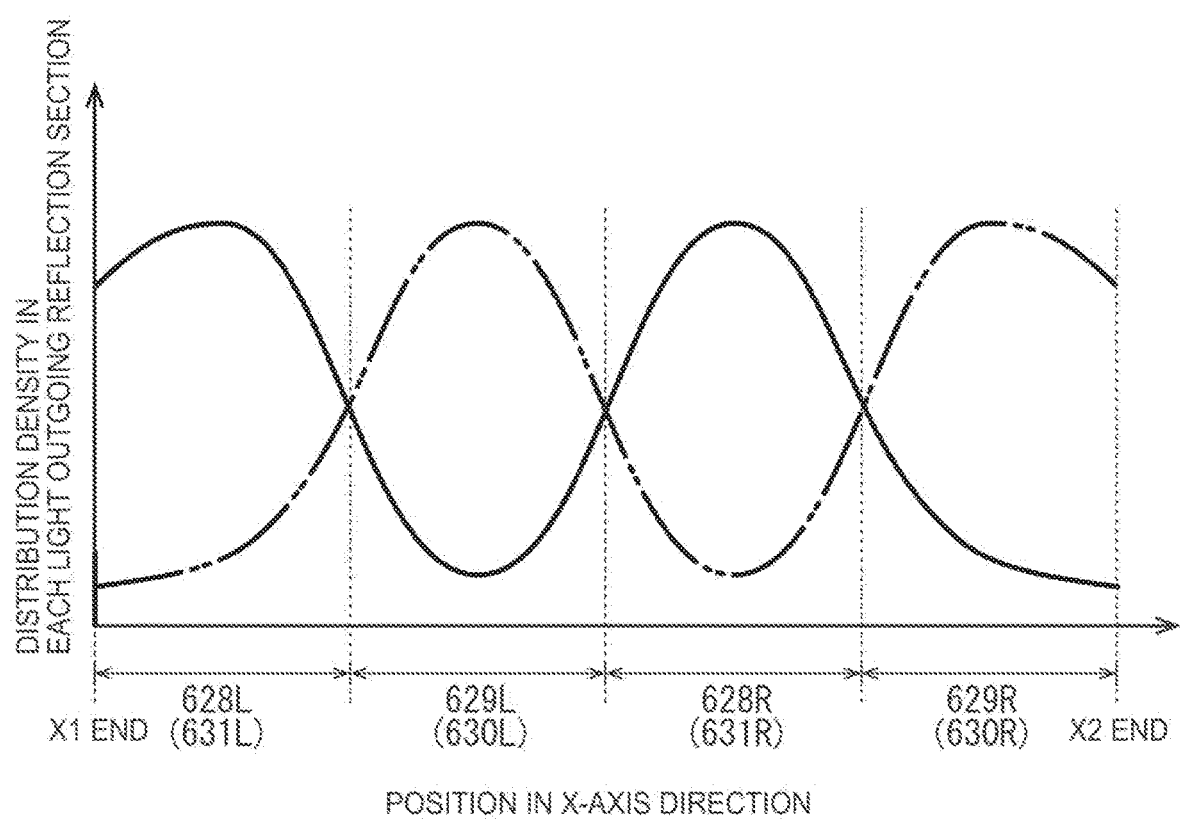
FIG. 19 is a graph illustrating a change in a distribution density of unit reflection sections constituting each of respective light outgoing reflection sections from an X1 end to an X2 end in light outgoing opposite plate surfaces of the light guide plates.

In the backlight device 612 having the above-described configuration, a first light outgoing reflection section 632 in a first light outgoing opposite plate surface 618c is patterned such that a pair of first high luminance light outgoing regions 628L and 628R and a pair of first low luminance light outgoing regions 629L and 629R are included, as illustrated in FIG. 17 and FIG. 19, in a first light outgoing plate surface 618b in the first light guide plate 618. FIG. 19 is a graph obtained by plotting respective distribution densities of unit reflection sections 632a and unit reflection sections 633a constituting the light outgoing reflection section 632 and a light outgoing reflection section 633, like FIG. 5, where a graph related to the first light outgoing reflection section 632 and a graph related to the second light outgoing reflection section 633 are respectively indicated by a solid line and a two-dot and dash line. The pair of first high luminance light outgoing regions 628L and 628R and the pair of first low luminance light outgoing regions 629L and 629R are disposed in a form alternately arranged in the X-axis direction in the first light outgoing plate surface 618b. More specifically, the first high luminance light outgoing region 628L the first low luminance light outgoing region 629L, the first high luminance light outgoing region 628R, and the first low luminance light outgoing region 629R are respectively disposed at a left end illustrated in FIG. 17 of the first light outgoing plate surface 618b, a position at the right of the first high luminance light outgoing region 628L, a position at the right of the first low luminance light outgoing region 629L, and a right end illustrated in FIG. 17 of the first light outgoing plate surface 618b. When the first LED 615 disposed on the left side illustrated in FIG. 16 of the first light guide plate 618 emits light, lights are mainly emitted, respectively, from the first high luminance light outgoing region 628L on the left side illustrated in FIG. 17 of the first light outgoing plate surface 618b and the first low luminance light outgoing region 629L on the left side illustrated in FIG. 17. On the other hand, when the first LED 615 disposed on the right side illustrated in FIG. 16 of the first light guide plate 618 emits light, lights are mainly emitted, respectively, from the first low luminance light outgoing region 629R on the right side illustrated in FIG. 17 of the first light outgoing plate surface 618b and the first high luminance light outgoing region 628L on the right side illustrated in FIG. 17.

Figure 18:
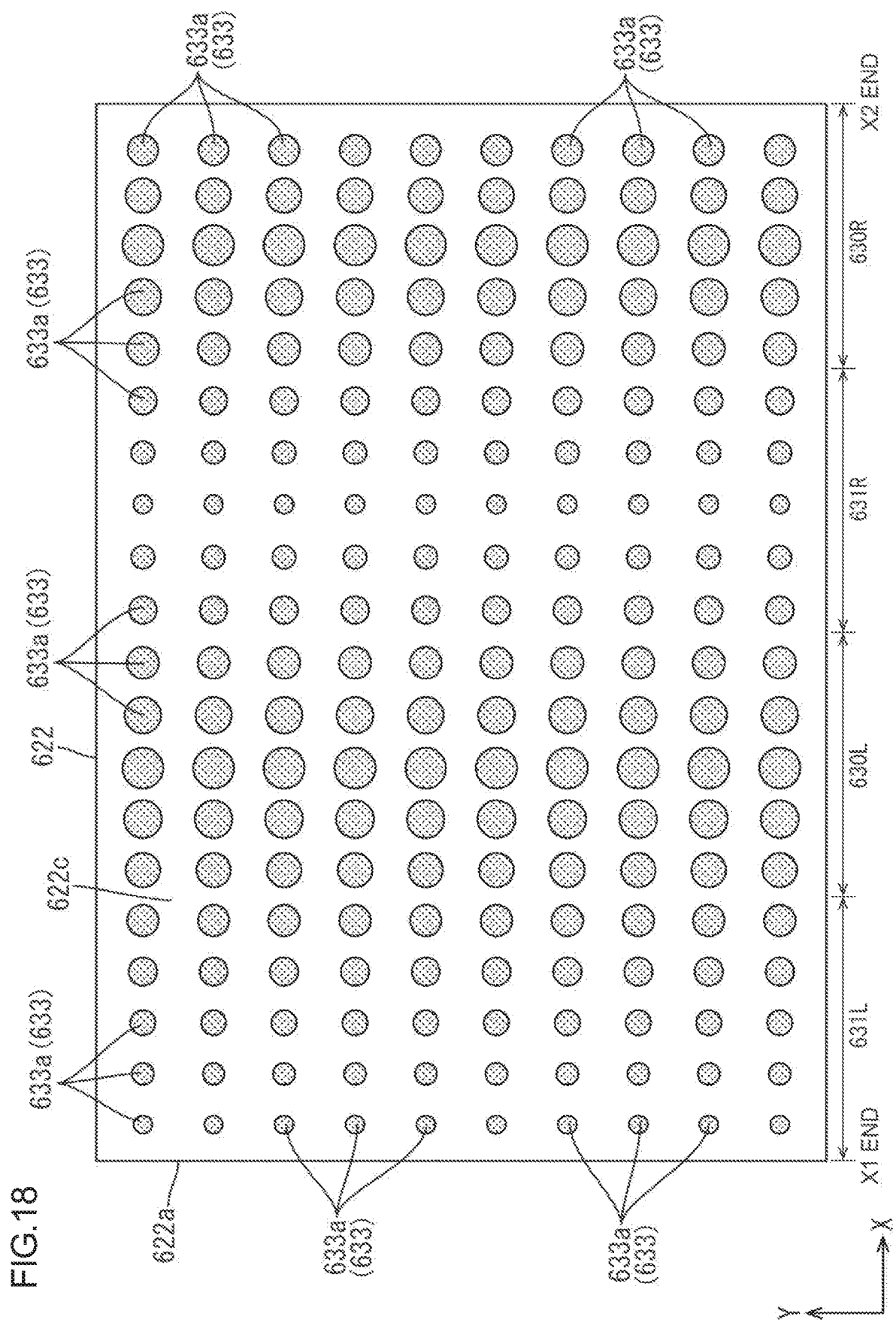
FIG. 18 is a bottom view of a second light guide plate constituting the backlight device.

The second light outgoing reflection section 633 in a second light outgoing opposite plate surface 622c is patterned such that a pair of second high luminance light outgoing regions 630L and 630R and a pair of second low luminance light outgoing regions 631L and 631R are included, as illustrated in FIG. 18 and FIG. 19, in a second light outgoing plate surface 622b of the second light guide plate 622. The pair of second high luminance light outgoing regions 630L and 630R and the pair of second low luminance light outgoing regions 631L and 631R are disposed in a form alternately arranged in the X-axis direction in the second light outgoing plate surface 622b. More specifically, the second low luminance light outgoing region 631L, the second high luminance light outgoing regions 630L, the second low luminance light outgoing region 631R, and the second low luminance light outgoing region 630R are respectively disposed at a left end illustrated in FIG. 18 of the second light outgoing plate surface 622b, a position at the right of the second low luminance light outgoing region 631L, a position at the right of the second high luminance light outgoing region 630L, and a right end illustrated in FIG. 18 of the second light outgoing plate surface 622b. Therefore, the pair of second high luminance light outgoing regions 630L and 630R and the pair of second low luminance light outgoing regions 631L and 631R are respectively arranged to overlap the pair of first low luminance light outgoing regions 629L and 629R and the pair of first high luminance light outgoing regions 628L and 628R. When the second LED 619 disposed on the left side illustrated in FIG. 16 of the second light guide plate 622 emits light, lights are mainly emitted, respectively, from the second low luminance light outgoing region 631L on the left side illustrated in FIG. 18 of the second light outgoing plate surface 622b and the second high luminance light outgoing region 630L on the left side illustrated in FIG. 18. On the other hand, when the second LED 619 disposed on the right side illustrated in FIG. 16 of the second light guide plate 622 emits light, lights are mainly emitted, respectively, from the second high luminance light outgoing region 630R on the right side illustrated in FIG. 18 of the second light outgoing plate surface 622b and the second low luminance light outgoing region 631R on the right side illustrated in FIG. 18. A distribution of the first unit reflection sections 232a in the first light outgoing reflection section 632 provided on the first light outgoing opposite plate surface 618c of the first light guide plate 618 illustrated in FIG. 17 and a distribution of the second unit reflection sections 633a in the second light outgoing reflection section 633 provided in the second light outgoing opposite plate surface 622c of the second light guide plate 622 illustrated in FIG. 18 are in a symmetrical relationship in the X-axis direction. Accordingly, the first light guide plate 618 and the second light guide plate 622 are set as the same component, and can be respectively used by being reversely arranged, which is favorable in achieving cost reduction.

Eighth Embodiment

An eighth embodiment of the present invention will be described with reference to FIG. 20. In the eighth embodiment, an alteration of an arrangement of the LED substrates 716 and 720 from the above-described first embodiment is illustrated. An overlapping description is omitted for a similar structure, function, and effect to those in the above-described first embodiment.

Figure 20:
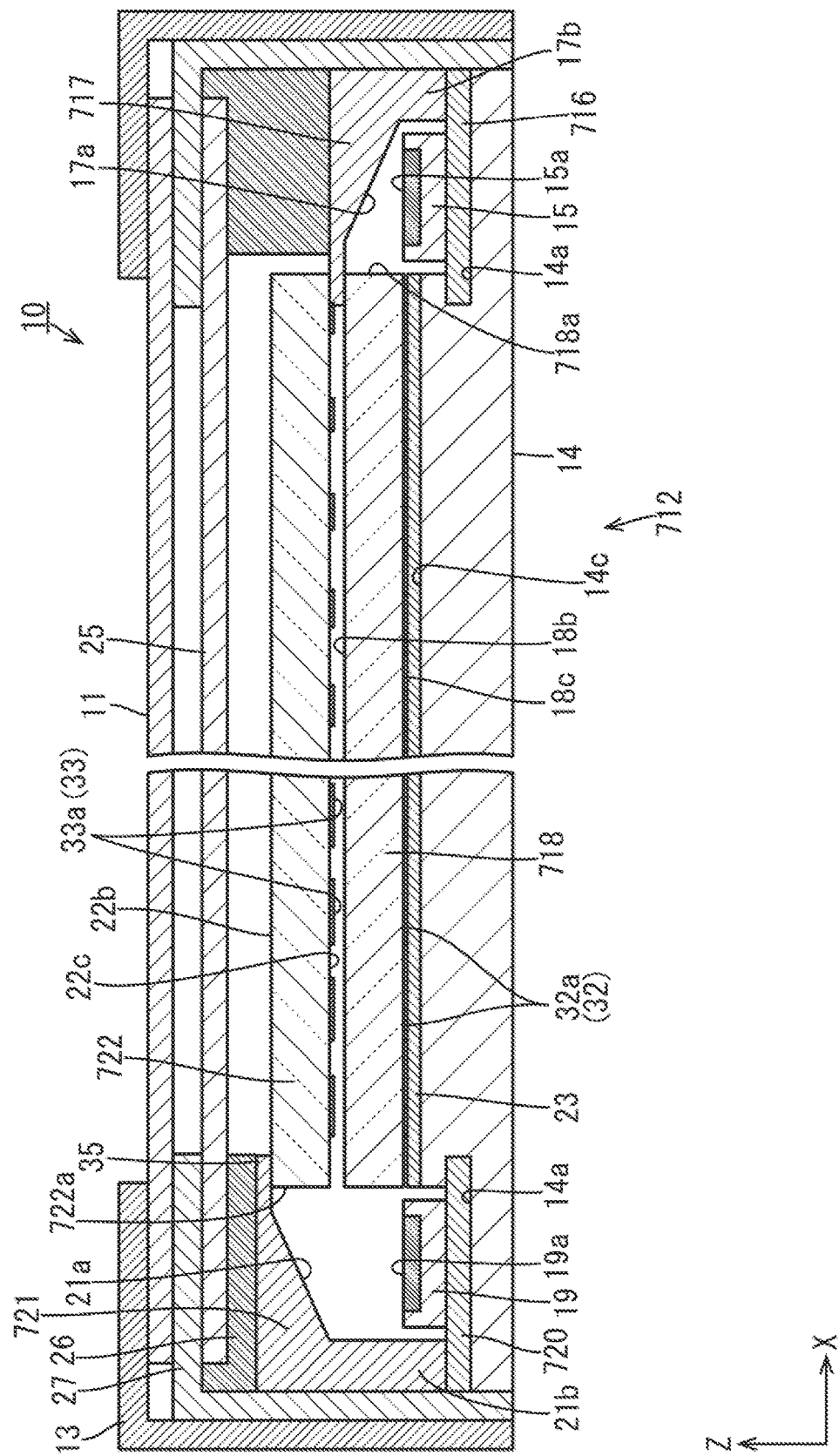
FIG. 20 is a side sectional view of a liquid crystal display device according to an eighth embodiment of the present invention.

A backlight device 712 according to the present embodiment has a configuration in which a first LED substrate 716 and a second LED substrate 720 are disposed on the opposite side to each other in an X-axis direction, as illustrated in FIG. 20. More specifically, the first LED substrate 716 and the second. LED substrate 720 are respectively disposed on the right side illustrated in FIG. 18 of a first light guide plate 718 and on the left side illustrated in FIG. 18 of a second light guide plate 722. Accordingly, first reflection member 717 and a second reflection member 721 are disposed on the opposite side to each other in the X-axis direction. A first light entrance end surface 718a of the first light guide plate 718 and a second light entrance end surface 722a of the second light guide plate 722 are disposed on the opposite side to each other in the X-axis direction. In such a configuration, the same light guide plate can be used as the first light guide plate 718 and the second light guide plate 722.

Other Embodiment

The present invention is not limited to the embodiments described by the above-described description and drawings, and embodiments, described below, for example, are also included in the technical scope of the present invention.

Figure 21:
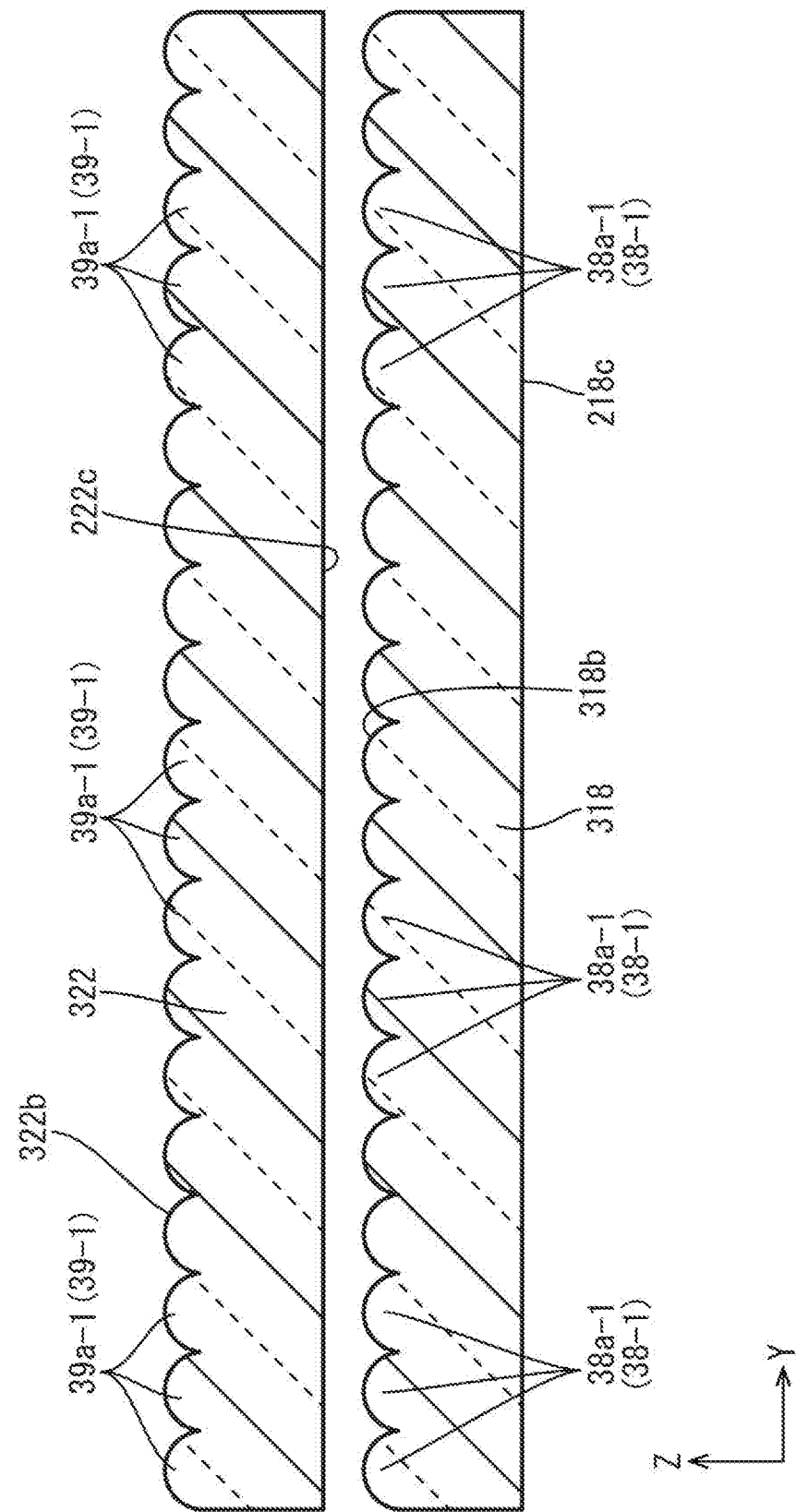
FIG. 21 is a front sectional view of each of light guide plates included in a backlight device constituting a liquid crystal display device according to another embodiment (1) of the present invention.

(1) As a modification to the above-described fourth embodiment, first unit light collection sections 38a-1 and second unit light collection sections 39a-1 respectively constituting a first light collection section 38-1 and a second light collection section 39-1 can also be each a lenticular lens, as illustrated n FIG. 21.

Figure 22:
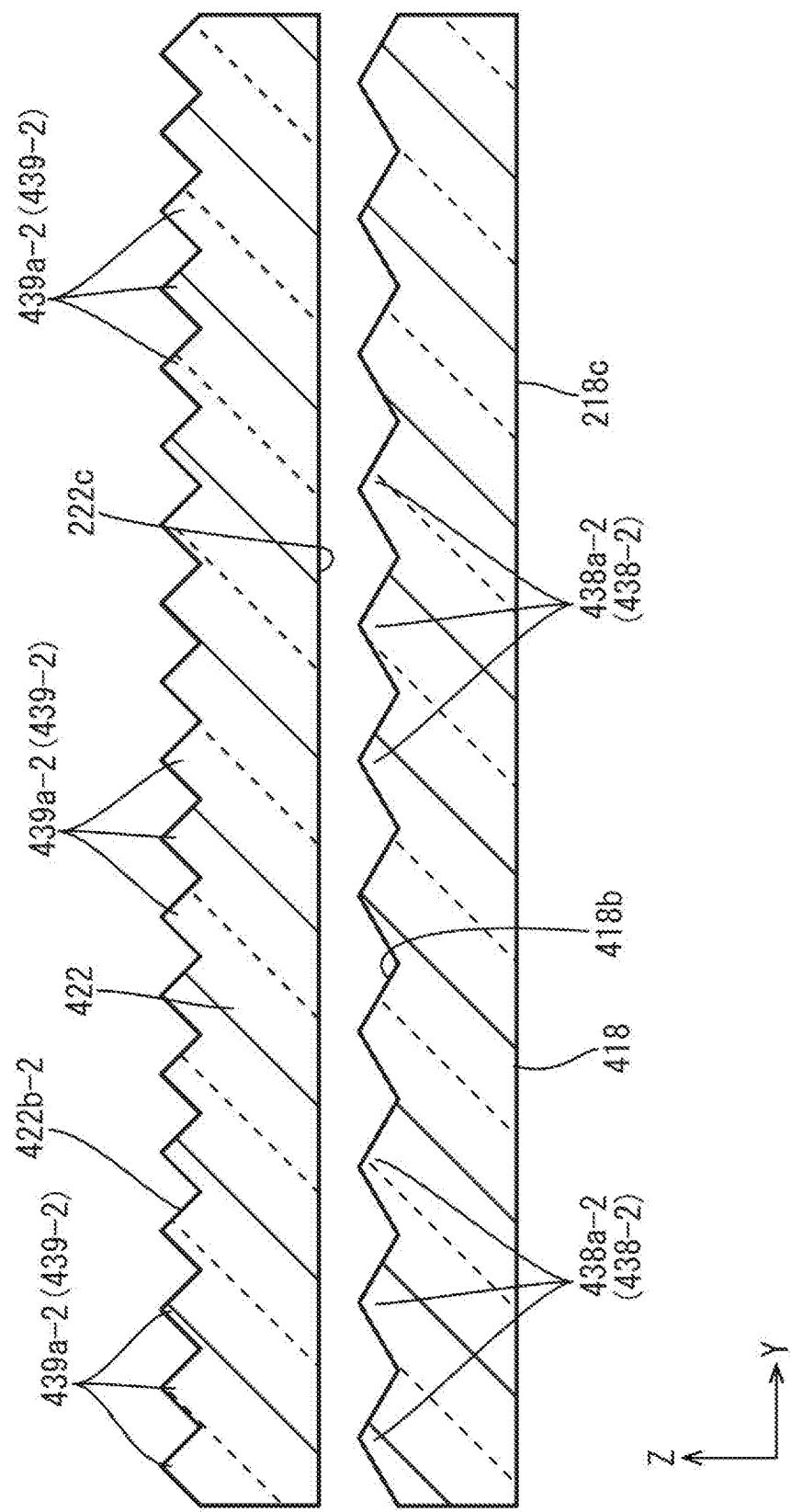
FIG. 22 is a front sectional view of each of light guide plates included in a backlight device constituting a liquid crystal display device according to another embodiment (2) of the present invention.

(2) As a modification to the above-described fifth embodiment, a vertex angle of first unit light collection sections 438a-2 in a first light collection section 438-2 can also be made larger than a vertex angle (90 degrees) of second unit light collection sections 439a-2 in a second light collection section 439-2, and an arrangement spacing in a Y-axis direction of the first unit light collection sections 438a-2 can also be made wider than an arrangement spacing of the second unit light collection sections as 439a-2, illustrated in FIG. 22. Accordingly, when the arrangement spacing of the second unit light collection sections 439a-2 is relatively narrowed, a high light collecting function can be provided to light to be emitted from a second light outgoing plate surface 422b-2.

(3) Although in each of the above-described embodiments, a case where the cross-sectional shape of each of the reflection surfaces is an inclined surface (linear surface) is illustrated, the cross-sectional shape of each of reflection surfaces can also be a curved surface such as a circular arc-shaped surface.

(4) Although in each of the above-described embodiments, a case where the diameter and the area of each of the unit reflection sections constituting each of the light outgoing reflection sections are changed depending on a position in the X-axis direction when a distribution density of the unit reflection sections is adjusted is illustrated, the diameter and the area of each of unit reflection sections are made constant regardless of a position in an X-axis direction, and a spacing (arrangement spacing) between the adjacent unit reflection sections is changed depending on the position in the X-axis direction, for example, so that a distribution density of the unit reflection sections can also be adjusted. When the diameter and the area of each of the unit reflection sections and the arrangement spacing between the unit reflection sections are changed depending on the position in the X-axis direction, the distribution density of the unit reflection sections can also be adjusted.

(5) Although in each of the above-described embodiments, a case where the light outgoing reflection sections are respectively provided on the light outgoing opposite plate surfaces of the light guide plates is illustrated, light outgoing reflection sections may be respectively provided on light outgoing plate surfaces of light guide plates.

(6) Although in each of the above-described embodiments, a case where the light outgoing reflection sections are respectively provided on the light guide plates by printing, the present invention is not limited to this. For example, light outgoing reflection sections can also be respectively provided on plate surfaces of light guide plates by performing surface roughing processing.

(7) In addition to the above-described embodiments, distribution of specific dot patterns in each of light outgoing reflection sections, a planar shape of each of unit reflection sections, and the like can be appropriately changed.

(8) As a modification to the above-described third to seventh embodiments, a common reflection member can be provided with a partition wall can also be provided in a form separating a first LED and a second LED lined up. Accordingly, a situation where light from the first LED and light from the second LED are respectively incident on a second light entrance end surface of a second light guide late and a first light entrance end surface of a first light guide plate can be prevented.

(9) Although in the above-described third to seventh embodiments, a case where the first light entrance end surface and the second light entrance end surface are disposed to be flush with each other is illustrated, a first light, entrance end surface and a second light entrance end surface may be arranged not to be aligned with each other in an X-axis direction.

(10) Although in the above-described sixth embodiment, a configuration in which the three light guide plates are arranged to overlap one another is illustrated, a configuration in which four or more light guide plates are arranged to overlap one another can also be adopted.

(11) The respective configurations described in the above-described fourth and fifth embodiments can also be combined with the respective configurations in the sixth to eighth embodiments. The respective configurations described in the above-described items (1) and (2) can also be combined with the respective configurations described in the sixth to eighth embodiments.

(12) The configuration described in the above-described sixth embodiment can also be combined with the respective configurations described in the seventh and eighth embodiments.

(13) The respective configurations described in the above-described fourth to seventh embodiments can also be combined with the respective configurations described in the first and second embodiments. The respective configurations described in the above-described items (1) and (2) can also be combined with the first and second embodiments.

(14) In addition to the above-described embodiments, a specific number of LEDs to be installed and a specific arrangement spacing of the LEDs, for example, can be appropriately changed.

(15) Although the LED is used as a light source in each of the above-described embodiments, another light source such as an organic EL can also be used.

(16) In addition to the above-described embodiments, a specific number of optical sheets used for a backlight device and a type of the optical sheet can be appropriately changed.

(17) Although in each of the above-described embodiments, the liquid crystal display device including the liquid crystal panel as a display panel is illustrated, the present invention is also applicable to an MEMS (micro electro mechanical systems) display device including an HEMS display panel as a display panel.

EXPLANATION OF SYMBOLS

10: Liquid crystal display device (display device),
11: Liquid crystal panel (display panel),
12, 112, 212, 512, 612, 712: Backlight device (lighting device),
15, 115, 215, 3:15, 615: First LED (first light source),
15a, 215a: First light emission surface,
16, 716: First LED substrate (first light source substrate),
17, 117, 217, 517, 717: First reflection member,
17a, 117a, 217a: First reflection surface,
18, 218, 318, 418, 518, 618, 718: First light guide plate,
18a, 218a, 318a, 518a, 618a, 718a: First light entrance end surface,
16b, 218b, 318b, 418b, 518b, 618b: First light outgoing plate surface,
19, 119, 219, 319, 619: Second LED (second light source),
19a, 219a: Second light emission surface,
20, 720: Second LED substrate (second light source substrate),
21, 121, 221, 521, 721: Second reflection member,
21a, 121a, 221a: Second reflection surface,
22, 222, 322, 422, 522, 622, 722: Second light guide plate,
22a, 222a, 322a, 522a, 622a, 722a: Second light entrance end surface,
22b, 222b, 322b, 422b, 422b-2, 522b, 622b: Second light outgoing plate surface,
28, 528, 628L, 628R: First high luminance light outgoing region,
29, 529, 6292, 629R: First low luminance light outgoing region,
30, 530, 630L, 630R: Second high luminance light outgoing region,
31, 531, 631L, 631R: Second low luminance light outgoing region,
32, 232, 532, 632: First light outgoing reflection section,
32a, 232a, 532a, 632a: First unit reflection section,
33, 233, 533, 633: Second light outgoing reflection section,
33a, 233a, 533a, 633a: Second unit reflection section,
36, 236, 536: Common LED substrate (common light source substrate),
37, 537, 637: Common reflection member,
38, 38-1, 438, 438-2: First light collection section,
38a, 38a-1, 438a, 438a-2: First unit light collection section,
39, 39-1, 439, 439-2: Second light collection section,
39a, 39a-1, 439a, 439a-2: Second unit light collection section

The invention claimed is:

1. A lighting device comprising:
a first light source of a top view emission type having a first light emission surface through which light is emitted;
a first light guide plate having an outer peripheral edge surface and plate surfaces, and having a first light entrance end surface that is a part of the outer peripheral edge surface thereof and through which light from the first light source enters and a first light outgoing plate surface that is one of the plate surfaces thereof and through which light exits, and the first light guide plate including a first high luminance light outgoing region that is—a part of the first light outgoing plate surface and through which a relatively large amount of light rays exit and a first low luminance light outgoing region that is—a part of the first light outgoing plate surface and through which a relatively small amount of light rays exit;
a first reflection member having a first reflection surface that opposes both the first light emission surface and the first light entrance end surface and reflects light emitted through the first light emission surface toward the first light entrance end surface;
a second light source of a top view emission type having a second light emission surface through which light is emitted;
a second light guide plate overlapping the first light guide plate and having an outer peripheral edge surface and plate surfaces, and having a second light entrance end surface that is a part of the outer peripheral edge surface thereof and through which light from the second light source enters and a second light outgoing plate surface that is one of the plate surfaces thereof and through which light exits, and the second light guide plate including a second high luminance light outgoing region that is a part of the second light outgoing plate surface and overlaps the first low luminance light outgoing region and through which a relatively large amount of light rays exit and a second low luminance light outgoing region that is a part of the second light outgoing plate surface and overlaps the first high luminance light outgoing region and through which a relatively small amount of light rays exit; and
a second reflection member having a second reflection surface that opposes both the second light emission surface and the second light entrance end surface and reflects light emitted through the second light emission surface toward the second light entrance end surface,
wherein the first light source and the second light source are arranged in a same column along the first light entrance end surface and the second light entrance end surface.

2. The lighting device according to claim 1, further comprising
a first light outgoing reflection section including first unit reflection sections that are provided on another one of the plate surfaces of the first light guide plate and reflect light to accelerate light exit through the first light outgoing plate surface; and
a second light outgoing reflection section including second unit reflection sections that are provided on another one of the plate surfaces of the second light guide plate and reflect light to accelerate light exit through the second light outgoing plate surface, wherein a distribution density of the first unit reflection sections is higher in the first high luminance light outgoing region than that in the first low luminance light outgoing region in the first light outgoing reflection section, and a distribution density of the second unit reflection sections is higher in the second high luminance light outgoing region than that in the second low luminance light outgoing region in the second light outgoing reflection section.

3. The lighting device according to claim 2, wherein a distribution of the first unit reflection sections in the first light outgoing reflection section is in a symmetrical relationship with a distribution of the second unit reflection sections in the second light outgoing reflection section.

4. The lighting device according to claim 1, wherein the first reflection member includes a first light guide plate overlapping section that overlaps, on a side of the first light outgoing plate surface, an end portion of the first light guide plate close to the first light entrance end surface, and the second reflection member includes a second light guide plate overlapping section that overlaps, on a side of the second light outgoing plate surface, an end portion of the second light guide plate close to the second light entrance end surface.

5. The lighting device according to claim 1, wherein the first light source includes first light sources, the second light source includes second light sources, and the first light sources and the second light sources are alternately and repeatedly arranged.

6. The lighting device according to claim 1, further comprising a common reflection member obtained by integrally including the first reflection member and the second reflection member and including the first reflection surface and the second reflection surface that are arranged in a line along the first light entrance end surface and the second light entrance end surface.

7. The lighting device according to claim 1, wherein the first light source includes first light sources that are arranged in a line along the first light entrance end surface and the second light source includes second light sources that are arranged in a line along the second light entrance end surface so as to be spaced apart from the first light sources in a normal direction of the first light entrance end surface.

8. The lighting device according to claim 7, further comprising
a first light source substrate on which the first light sources are mounted; and
a second light source substrate on which the second light sources are mounted and that is arranged on a different height from the first light source substrate.

9. A display device comprising:
the lighting device according to claim 1, and
a display panel that displays an image using light irradiated from the lighting device.

10. A lighting device comprising:
a first light source of a top view emission type having a first light emission surface through which light is emitted;
a first light guide plate having an outer peripheral edge surface and plate surfaces, and having a first light entrance end surface that is a part of the outer peripheral edge surface thereof and through which light from the first light source enters and a first light outgoing plate surface that is one of the plate surfaces thereof and through which light exits, and the first light guide plate including a first high luminance light outgoing region that is a part of the first light outgoing plate surface and through which a relatively large amount of light rays exit and a first low luminance light outgoing region that is a part of the first light outgoing plate surface and through which a relatively small amount of light rays exit;
a first reflection member having a first reflection surface that opposes both the first light emission surface and the first light entrance end surface and reflects light emitted through the first light emission surface toward the first light entrance end surface;
a second light source of a top view emission type having a second light emission surface through which light is emitted;
a second light guide plate overlapping the first light guide plate, having an outer peripheral edge surface and plate surfaces, and having a second light entrance end surface that is a part of the outer peripheral edge surface thereof and through which light from the second light source enters and a second light outgoing plate surface that is one of the plate surfaces thereof and through which light exits, and the second light guide plate including a second high luminance light outgoing region that is a part of the second light outgoing plate surface and overlaps the first low luminance light outgoing region and through which a relatively large amount of light rays exit and a second low luminance light outgoing region that is a part of the second light outgoing plate surface and overlaps the first high luminance light outgoing region and through which a relatively small amount of light rays exit; and
a second reflection member having a second reflection surface that opposes both the second light emission surface and the second light entrance end surface and reflects light emitted through the second light emission surface toward the second light entrance end surface, wherein:
the first light source includes first light sources that are arranged in a line along the first light entrance end surface and the second light source includes second light sources that are arranged in a line along the second light entrance end surface so as to be spaced apart from the first light sources in a normal direction of the first light entrance end surface; and
the lighting device further comprises a common light source substrate on which the first light sources and the second light sources are mounted.

11. A lighting device comprising:
a first light source of a top view emission type having a first light emission surface through which light is emitted;
a first light guide plate having an outer peripheral edge surface and plate surfaces, and having a first light entrance end surface that is a part of the outer peripheral edge surface thereof and through which light from the first light source enters and a first light outgoing plate surface that is one of the plate surfaces thereof and through which light exits, and the first light guide plate including a first high luminance light outgoing region that is a part of the first light outgoing plate surface and through which a relatively large amount of light rays exit and a first low luminance light outgoing region that is a part of the first light outgoing plate surface and through which a relatively small amount of light rays exit;
a first reflection member having a first reflection surface that opposes both the first light emission surface and the first light entrance end surface and reflects light emitted through the first light emission surface toward the first light entrance end surface;

a second light source of a top view emission type having a second light emission surface through which light is emitted;

a second light guide plate overlapping the first light guide plate, having an outer peripheral edge surface and plate surfaces, and having a second light entrance end surface that is a part of the outer peripheral edge surface thereof and through which light from the second light source enters and a second light outgoing plate surface that is one of the plate surfaces thereof and through which light exits, and the second light guide plate including a second high luminance light outgoing region that is a part of the second light outgoing plate surface and overlaps the first low luminance light outgoing region and through which a relatively large amount of light rays exit and a second low luminance light outgoing region that is a part of the second light outgoing plate surface and overlaps the first high luminance light outgoing region and through which a relatively small amount of light rays exit; and a second reflection member having a second reflection surface that opposes both the second light emission surface and the second light entrance end surface and reflects light emitted through the second light emission surface toward the second light entrance end surface, wherein:

the first light source includes first light sources and the second light source includes second light sources, the first light sources and the second light sources are arranged along the first light entrance end surface and the second light entrance end surface, respectively; and the first light guide plate includes a first light collection section on the first light outgoing plate surface, the first light collection section includes first unit light collection sections extending in a normal direction of the first light entrance end surface and arranged in an arrangement direction in which the first light sources are arranged, and the second light guide plate includes a second light collection section on the second light outgoing plate surface, the second light collection section includes second unit light collection sections extending in a normal direction of the second light entrance end surface and arranged in an arrangement direction in which the second light sources are arranged.

12. The lighting device according to claim 11, wherein the first unit light collection sections of the first light collection section and the second unit light collection sections of the second light collection section differ from each other in at least one of a cross-sectional shape and an arrangement interval.

* * * * *